(12) United States Patent
Muraki et al.

(10) Patent No.: US 10,790,481 B2
(45) Date of Patent: Sep. 29, 2020

(54) PACKAGING MATERIAL FOR POWER STORAGE DEVICE AND METHOD FOR MANUFACTURING PACKAGING MATERIAL FOR POWER STORAGE DEVICE

(71) Applicant: TOPPAN PRINTING CO., LTD., Tokyo (JP)

(72) Inventors: Takuya Muraki, Tokyo (JP); Tomohiko Yamazaki, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 215 days.

(21) Appl. No.: 16/014,379

(22) Filed: Jun. 21, 2018

(65) Prior Publication Data
US 2018/0301671 A1 Oct. 18, 2018

Related U.S. Application Data

(63) Continuation of application No. PCT/JP2017/003740, filed on Feb. 2, 2017.

(30) Foreign Application Priority Data

Feb. 3, 2016 (JP) .................. 2016-018950
Feb. 3, 2016 (JP) .................. 2016-018953

(51) Int. Cl.
*H01M 2/02* (2006.01)
*H01G 11/78* (2013.01)
(Continued)

(52) U.S. Cl.
CPC .......... *H01M 2/0287* (2013.01); *H01G 11/78* (2013.01); *H01G 11/82* (2013.01); (Continued)

(58) Field of Classification Search
CPC . H01M 2/0287; H01M 2/0277; H01M 2/0275
See application file for complete search history.

(56) References Cited

U.S. PATENT DOCUMENTS

2009/0191448 A1* 7/2009 Yamamoto .............. B29C 70/72
429/94
2014/0072864 A1* 3/2014 Suzuta .................. B32B 27/365
429/176
(Continued)

FOREIGN PATENT DOCUMENTS

| JP | 2013-101765 A | 5/2013 |
| JP | 2014-091770 A | 5/2014 |
| WO | WO-2016/010044 A1 | 1/2016 |

OTHER PUBLICATIONS

International Search Report with English language translation and Written Opinion issued in International Application No. PCT/JP2017/003740 dated May 9, 2017.
(Continued)

*Primary Examiner* — Maria Laios
(74) *Attorney, Agent, or Firm* — Foley & Lardner LLP

(57) ABSTRACT

The present invention relates to a packaging material for a power storage device, the packaging material having a structure in which at least a substrate protective layer, a substrate layer, an adhesive layer, a metal foil layer, a sealant adhesive layer, and a sealant layer are laminated in this order, wherein the substrate protective layer is a cured product of a raw material containing a polyester resin and a polyisocyanate, a ratio [NCO]/[OH] is 5 to 60, where [OH] is the number of moles of hydroxyl groups in the polyester resin, and [NCO] is the number of moles of isocyanate groups in the polyisocyanate, and the polyester resin has a hydroxyl value of 10 to 70 KOHmg/g.

10 Claims, 3 Drawing Sheets

(51) Int. Cl.
*H01G 11/84* (2013.01)
*H01G 11/82* (2013.01)
*H01M 2/32* (2006.01)
*H01M 10/38* (2006.01)
*H01M 2/08* (2006.01)

(52) U.S. Cl.
CPC .......... *H01G 11/84* (2013.01); *H01M 2/0275* (2013.01); *H01M 2/0277* (2013.01); *H01M 2/0285* (2013.01); *H01M 2/32* (2013.01); *H01M 10/38* (2013.01); *Y02E 60/13* (2013.01)

(56) References Cited

U.S. PATENT DOCUMENTS

| | | | | |
|---|---|---|---|---|
| 2015/0380695 | A1* | 12/2015 | Hanaki | B32B 15/095 429/176 |
| 2017/0207427 | A1* | 7/2017 | Kouka | B32B 15/095 |
| 2018/0108880 | A1* | 4/2018 | Muroi | B32B 27/16 |

OTHER PUBLICATIONS

Extended European Search Report dated Feb. 12, 2019 in corresponding application No. 17747512.6.

* cited by examiner

PACKAGING MATERIAL FOR POWER STORAGE DEVICE AND METHOD FOR MANUFACTURING PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/003740, filed on Feb. 2, 2017, which is based upon and claims the benefit of priority to Japanese Patent Application Nos. 2016-018950, filed on Feb. 3, 2016, and 2016-018953, filed on Feb. 3, 2016. The disclosures of which are all hereby incorporated herein by reference in their entireties.

TECHNICAL FIELD

The present invention relates to a packaging material for a power storage device and a method for manufacturing a packaging material for a power storage device.

BACKGROUND ART

Power storage devices are known to include secondary batteries, such as lithium ion batteries, nickel hydride batteries, and lead batteries, and electrochemical capacitors, such as electric double layer capacitors. Due to miniaturization of mobile devices, limitation of installation spaces, or the like, further miniaturization of power storage devices is sought, and thus attention is being given to lithium ion batteries for their high energy density. Packaging materials for lithium ion batteries have conventionally been metal cans; however, multilayer films are increasingly used because they are lightweight, highly heat dissipating, and produced at low cost.

Such a lithium ion battery using the multilayer film as a packaging material uses a configuration in which battery contents (e.g., cathode, separator, anode, electrolyte solution) are covered with a packaging material including an aluminum foil layer to thereby prevent moisture from penetrating into the battery. A lithium ion battery using such a configuration is referred to as an aluminum laminated lithium ion battery.

Embossed lithium ion batteries, for example, are known as aluminum laminated lithium ion batteries. In such an embossed lithium ion battery, a recessed portion is formed at part of the packaging material by cold forming, battery contents are stored in the recessed portion, and the rest of the packaging material is folded back, followed by heat sealing the edge portions (e.g., see PTL 1). With such a lithium ion battery, a recess formed deeper by cold forming enables storage of more battery contents to achieve higher energy density.

CITATION LIST

[Patent Literature] [PTL 1] JP 2013-101765 A

SUMMARY OF THE INVENTION

However, when deep drawing is performed on a conventional packaging material for a lithium ion battery to form a deep recess, the adhesive layer and the metal foil layer may sometimes be broken. Accordingly, the packaging material is required to have excellent deep drawing formability.

In order to improve the formability, a nylon film may be used as a substrate layer on the outermost layer of the packaging material. However, there is a problem in that when the nylon film, which is basic, is brought into contact with an (acidic) electrolyte for lithium ion batteries, the nylon film is melted and cannot exhibit the characteristics of a packaging material.

Moreover, a protective layer may be further provided on the outer layer for the purpose of protecting the substrate layer from external influence, such as an electrolyte mentioned above. However, the substrate layer undergoes thermal shrinkage due to heating during lamination or drying in the production process of the packaging material; thus, the adhesion between the substrate layer and the protective layer may be reduced. The adhesion is likely to be reduced, not only in a high-temperature environment during lamination or drying, but also in warm water or a high-temperature and high-humidity environment.

The present invention has been made in view of the above circumstances, and has a first object to provide a packaging material for a power storage device, the packaging material having improved and even excellent formability and electrolyte resistance, and also having improved and even excellent adhesion between the substrate layer and the protective layer. The present invention has another object to provide a method for manufacturing such a packaging material for a power storage device.

Moreover, the present invention has a second object to provide a packaging material for a power storage device, the packaging material having improved and even excellent formability and electrolyte resistance. The present invention has another object to provide a method for manufacturing such a packaging material for a power storage device.

Solution to Problem

In order to achieve the first object, a first aspect of the invention provides a packaging material for a power storage device, the packaging material having a structure in which at least a substrate protective layer, a substrate layer, an adhesive layer, a metal foil layer, a sealant adhesive layer, and a sealant layer are laminated in this order, wherein the substrate protective layer is a cured product of a raw material containing a polyester resin and a polyisocyanate, a ratio [NCO]/[OH] is 5 to 60, where [OH] is the number of moles of hydroxyl groups in the polyester resin, and [NCO] is the number of moles of isocyanate groups in the polyisocyanate, and the polyester resin has a hydroxyl value of 10 to 70 KOHmg/g.

The packaging material for a power storage device of the first aspect of the invention has improved and even excellent formability and electrolyte resistance, and also has improved and even excellent adhesion between the substrate layer and the protective layer. In general, a nylon film is sometimes used on the outermost layer of a consumer packaging material for a lithium ion battery in order to improve the formability. However, when the nylon film, which is basic, is brought into contact with an (acidic) electrolyte for lithium ion batteries, the nylon is melted and cannot be used in a battery cell. In order to solve such problems caused by the films used, in the present invention, a coating layer obtained by mixing a polyisocyanate with a polyester resin is further provided as a substrate protective layer on the outermost layer of the film. In this case, suitable characteristics can be imparted to the coating layer using the polyester resin and polyisocyanate specified above.

Second Aspect of the Invention

In order to achieve the second object, a second aspect of the invention provides a packaging material for a power storage device, the packaging material having a structure in which at least a substrate protective layer, a substrate layer, an adhesive layer, a metal foil layer, a sealant adhesive layer, and a sealant layer are laminated in this order, wherein the substrate protective layer is a cured product of a raw material containing an aromatic polyester urethane resin and a polyisocyanate, and a ratio [NCO]/[OH] is 5 to 20, where [OH] is the number of moles of hydroxyl groups in the aromatic polyester urethane resin, and [NCO] is the number of moles of isocyanate groups in the polyisocyanate.

The packaging material for a power storage device of the second aspect of the invention has improved and even excellent formability and electrolyte resistance, and also has improved and even excellent adhesion between the substrate layer and the protective layer. In general, a nylon film is sometimes used on the outermost layer of a consumer packaging material for a lithium ion battery in order to improve the formability. However, when the nylon film, which is basic, is brought into contact with an (acidic) electrolyte for lithium ion batteries, the nylon is melted and cannot be used as a battery cell. In order to solve such problems caused by the films used, in the present invention, a coating layer obtained by mixing a polyisocyanate with an aromatic polyester urethane resin is further provided as a substrate protective layer on the outermost layer of the film. In this case, suitable characteristics can be imparted to the coating layer using an aromatic polyester urethane resin and a polyisocyanate at the mixing ratio specified above. The aromatic polyester used as a raw material of the aromatic polyester urethane resin has improved and even excellent resistance to hydrolysis (by acid); thus, even if the coating layer is brought into contact with an electrolyte, the nylon film can be protected without deterioration of the substrate protective layer.

In the present invention, when a constant voltage of 100 V is applied for 3 minutes between the substrate protective layer and the metal foil layer in a state in which water is attached to the substrate protective layer, the insulation resistance between the layers is preferably 2000 MΩ or more. Thereby, for example, when a film that easily absorbs moisture (e.g., a Ny film) is used as the substrate layer, it is possible to reduce the possibility that the metal foil layer also becomes energized and affects the battery capacity. In particular, in high-humidity environments or environments in which rain water, flooding etc. may possibly occur, such as on-vehicle applications and power tool applications, the packaging material preferably has this level of insulating properties in a state in which water is attached to the substrate protective layer.

In the present invention, the polyisocyanate preferably contains 50 mass % or more of polyisocyanate that does not have an alicyclic structure. In particular, the polyisocyanate that does not have an alicyclic structure is preferably an aliphatic polyisocyanate, and more preferably an adduct or biuret form of an aliphatic polyisocyanate. The electrolyte resistance and alcohol resistance of the substrate protective layer can thereby be further improved.

In the second aspect of the invention, the aromatic polyester urethane resin is preferably a blend of two or more aromatic polyester urethane resins having different glass transition temperatures (Tg), from the perspective of balancing the hardness and other characteristics of the resin.

The above raw material for forming the substrate protective layer may further contain a filler. This makes it possible to further improve the sliding properties of the packaging material, and to impart appearance designability to the packaging material.

Moreover, the present invention provides a method for manufacturing a packaging material for a power storage device, the method comprising the steps of: bonding a substrate layer to one surface of a metal foil layer with an adhesive layer interposed therebetween; forming a substrate protective layer on a surface of the substrate layer which faces away from the adhesive layer; and forming a sealant layer on a surface of the metal foil layer which faces away from the adhesive layer with a sealant adhesive layer interposed therebetween, wherein the substrate protective layer is a cured product of a raw material containing a polyester resin and a polyisocyanate, a ratio [NCO]/[OH] is 5 to 60, where [OH] is the number of moles of hydroxyl groups in the polyester resin, and [NCO] is the number of moles of isocyanate groups in the polyisocyanate, and the polyester resin has a hydroxyl value of 10 to 70 KOHmg/g.

Furthermore, the present invention provides a method for manufacturing a packaging material for a power storage device, the method comprising the steps of: bonding a substrate layer to one surface of a metal foil layer with an adhesive layer interposed therebetween; forming a substrate protective layer on a surface of the substrate layer which faces away from the adhesive layer; and forming a sealant layer on a surface of the metal foil layer which faces away from the adhesive layer with a sealant adhesive layer interposed therebetween, wherein the substrate protective layer is a cured product of a raw material containing an aromatic polyester urethane resin and a polyisocyanate, and a ratio [NCO]/[OH] is 5 to 20, where [OH] is the number of moles of hydroxyl groups in the aromatic polyester urethane resin, and [NCO] is the number of moles of isocyanate groups in the polyisocyanate.

Desired Advantageous Effects of the Invention

The first aspect of the invention can provide a packaging material for a power storage device, the packaging material having improved and even excellent formability and electrolyte resistance, and also having improved and even excellent adhesion between the substrate layer and the protective layer. Moreover, the second aspect of the invention can provide a packaging material for a power storage device, the packaging material having improved and even excellent formability and electrolyte resistance. Furthermore, the present invention can provide a method for manufacturing such a packaging material for a power storage device.

DESCRIPTION OF REPRESENTATIVE EMBODIMENTS

Figure 1:
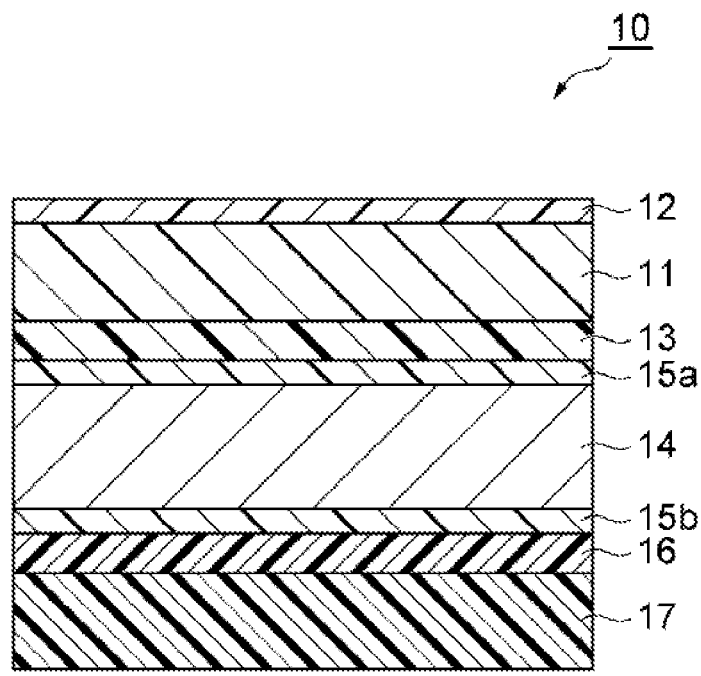
FIG. 1 is a schematic cross-sectional view illustrating a power storage device packaging material, according to an embodiment of the present invention.

With reference to the drawings, preferred embodiments of the present invention will be described in detail. It is to be understood that the present invention is not limited to the following embodiments, which are intended to be representative of the present invention. The representative embodiments described below are merely examples of the present invention, and the design thereof could be appropriately changed by one skilled in the art. In the drawings, the same or corresponding parts are denoted by the same reference signs to omit duplicate description.

First Embodiment

[Packaging Material for Power Storage Device]

FIG. 1 is a schematic cross-sectional view illustrating an embodiment of a packaging material for a power storage device of the present invention. As illustrated in FIG. 1, a packaging material (packaging material for power storage device) 10 of the present embodiment is a laminate sequentially laminated with a substrate layer 11, a substrate protective layer 12 provided on a surface of the substrate layer 11, an adhesive layer 13 provided on a surface of the substrate layer 11 which faces away from the substrate protective layer 12, a metal foil layer 14 provided on a surface of the adhesive layer 13 which faces away from the substrate layer 11 and having anticorrosion treatment layers 15a and 15b on opposing surfaces thereof, a sealant adhesive layer 16 provided on a surface of the metal foil layer 14 which faces away from the adhesive layer 13, and a sealant layer 17 provided on a surface of the sealant adhesive layer 16 which faces away from the metal foil layer 14. The anticorrosion treatment layer 15a is provided on an adhesive layer 13 side surface of the metal foil layer 14 and the anticorrosion treatment layer 15b is provided on a sealant adhesive layer 16 side surface of the metal foil layer 14. In the packaging material 10, the substrate protective layer 12 is the outermost layer and the sealant layer 17 is the innermost layer. That is, the packaging material 10 is used, with the substrate protective layer 12 being on the outside of the power storage device and the sealant layer 17 being on the inside of the power storage device. Each layer is described below.

(Substrate Layer 11)

The substrate layer 11 plays the role of imparting heat resistance in a sealing process in the production of power storage devices, and suppressing the formation of pinholes that may occur during molding or distribution. Particularly in the case of, for example, packaging materials for large power storage devices, scratch resistance, chemical resistance, insulating properties, etc., can also be imparted.

The substrate layer 11 preferably comprises a resin film made of a resin having insulating properties. Examples of the resin film include stretched or unstretched films, such as polyester films, polyamide films, and polypropylene films. The substrate layer 11 may be a monolayer film made of one of these resin films, or a laminated film made of two or more of these resin films.

Of these films, the substrate layer 11 is preferably a polyamide film, and more preferably a biaxially stretched polyamide film, in terms of improved and even excellent formability. Examples of polyamide resins that form polyamide films include Nylon-6, Nylon -6,6, a copolymer of Nylon-6 and Nylon-6,6, Nylon-6,10, polymetaxylylene adipamide (MXD6), Nylon-11, Nylon-12, and the like. Among these, Nylon 6 (ONy) is preferable in terms of improved and even excellent heat resistance, piercing strength, and impact strength.

Examples of stretching method for the biaxially stretched film include sequential biaxial stretch, tubular biaxial stretch, and simultaneous biaxial stretch. From the perspective of obtaining better deep drawing formability, the biaxially stretched film is preferably stretched using a tubular biaxial stretching method.

The substrate layer 11 preferably has a thickness in the range of 6 to 40 μm and more preferably 10 to 30 μm. When the substrate layer 11 has a thickness of 6 μm or more, pinhole resistance and insulating properties are likely to be improved in the packaging material 10 for a power storage device. If the substrate layer 11 has a thickness of more than 40 μm, the total thickness of the packaging material 10 for a power storage device is increased and the battery electrical capacity may have to be reduced. Therefore, this range of thickness is not desirable.

(Substrate Protective Layer 12)

The substrate protective layer 12 is provided on one surface of the substrate layer 11, and is formed using a polyester resin (having, in side chains, hydroxyl groups reactive with the isocyanate groups of the polyisocyanate) and a polyisocyanate. That is, the substrate protective layer 12 is a cured product of a raw material containing a polyester resin and a polyisocyanate.

The polyester resin having hydroxyl groups in side chains (polyester polyol) is a polyester resin having a hydroxyl group in a side chain, in addition to a hydroxyl group at the end of the repeat unit. Examples of such polyester resins include a polyester resin obtained by reaction of one or more dicarboxylic acids and one or more compounds having three or more hydroxyl groups. An unreacted part among the hydroxyl groups of the compound having three or more hydroxyl groups becomes a hydroxyl group in a side chain of the polyester resin. Usable dicarboxylic acids are both aliphatic dicarboxylic acids and aromatic dicarboxylic acids; specific examples thereof include aliphatic dicarboxylic acids, such as succinic acid, glutaric acid, adipic acid, pimelic acid, suberic acid, azelaic acid, sebacic acid, and brassylic acid; and aromatic dicarboxylic acids, such as isophthalic acid, terephthalic acid, and naphthalene dicarboxylic acid. Examples of compounds having three or more hydroxyl groups include hexanetriol, trimethylolpropane, pentaerythritol, and the like.

The above polyester resin may be a compound obtained by reaction of a diol, if necessary, in addition to one or more dicarboxylic acids and one or more compounds having three or more hydroxyl groups. Examples of diols include aliphatic diols, such as ethylene glycol, propylene glycol, butanediol, neopentyl glycol, methyl pentanediol, hexanediol, heptanediol, octanediol, nonanediol, decanediol, and dodecanediol; alicyclic diols, such as cyclohexanediol and hydrogenated xylylene glycol; and aromatic diols, such as xylylene glycol.

Regarding the molecular weight of the polyester resin, the number average molecular weight (Mn) is preferably 3000 to 10000, in terms of solubility.

In the present embodiment, the hydroxyl value of the polyester resin is 10 to 70 KOHmg/g. If the hydroxyl value is less than 10, it is difficult for the adhesion between the substrate protective layer 12 and the substrate layer 11 to be sufficiently exhibited even when a polyester resin and a polyisocyanate are appropriately mixed, as described later. In contrast, if the hydroxyl value exceeds 70, the molecular weight of the polyester resin tends to be overly small; thus, the film strength may be reduced, and the crosslinked structure may become dense and fragile. From such a viewpoint, the hydroxyl value of the polyester resin is preferably 30 to 70 KOHmg/g. The hydroxyl value can be measured in such a manner that, for example, hydroxyl groups in the sample is acetylated with acetic anhydride, and unused acetic acid is titrated with a potassium hydroxide solution.

Usable examples of the polyisocyanate include various polyisocyanates, such as aromatic polyisocyanates, aliphatic polyisocyanates, and alicyclic polyisocyanates. Specific examples thereof include aliphatic polyisocyanates, such as hexamethylene diisocyanate (HDI); aromatic polyisocyanates, such as tolylene diisocyanate (TDI) and diphenylmethane diisocyanate (MDI); alicyclic polyisocyanates, such as isophorone diisocyanate (IPDI); modified polyfunctional isocyanates obtained from one or more of these diisocyanates; and the like.

Among aromatic polyisocyanates, aliphatic polyisocyanates, and alicyclic polyisocyanates, in the present embodiment, polyisocyanates that do not have an alicyclic structure (not alicyclic polyisocyanates) are preferable, and aliphatic polyisocyanates are more preferable, in terms of improving electrolyte resistance. In particular, an adduct or biuret form of hexamethylene diisocyanate is suitably used to impart electrolyte resistance. In addition, when a polyisocyanate that does not have an alicyclic structure is used in an amount of 50 mass % or more based on the total mass (100 mass %) of the polyisocyanate, there is a tendency that alcohol resistance is also exhibited. For example, when a battery cell manufacturer performs printing with an inkjet printer for lot trace management, incorrect information is sometimes printed. In that case, reprinting is performed after the printed part is wiped with alcohol, and such a polyisocyanate type is effective in terms of improving the wiping resistance to alcohol.

The mixing ratio of the polyester resin, which is a main resin, and the polyisocyanate, which is a curing agent, is such that the ratio [NCO]/[OH] is 5 to 60, where [OH] is the number of moles of hydroxyl groups in the polyester resin, and [NCO] is the number of moles of isocyanate groups in the polyisocyanate. The resistance to electrolytes is considered to be affected by the crosslinked structure of the substrate protective layer 12. Accordingly, the inventors consider it to be necessary to increase the crosslinking density by providing an excess amount of isocyanate groups of the polyisocyanate to the hydroxyl groups of the polyester resin. If the ratio [NCO]/[OH] is less than 5, the crosslinked structure is insufficient, and it is difficult to impart improved and even excellent electrolyte resistance. In contrast, if the ratio [NCO]/[OH] exceeds 60, the crosslinked structure is overly dense (the substrate protective layer 12 is overly hard), and undesirable influence may be caused on molding etc. If the polyisocyanate ratio is low, the adhesion between the substrate protective layer 12 and the substrate layer 11 is less likely to be obtained; thus, the above range is preferable. From such a viewpoint, the ratio [NCO]/[OH] is preferably 20 to 60.

As described above, the substrate protective layer 12 is formed using a raw material containing a polyester resin and a polyisocyanate. The raw material may also contain various additives, such as fillers, flame retardants, lubricants (slip agents), anti-blocking agents, antioxidants, photostabilizers, tackifiers, leveling agents for imparting coating stability, various stabilizers, such as antifoaming agents, catalysts for preventing blocking after coating (promoting the reaction of the coating agent), and reaction retardants for controlling the pot life of the coating agent (acetylacetone being preferably used).

Because the raw material contains a filler, matte treatment can be performed on the outer surface of the substrate protective layer 12. In the present embodiment, the substrate protective layer 12 is a coating layer formed from a polyester resin and a polyisocyanate; thus, for example, compared with nylon (the substrate layer itself), sliding properties tend to be inferior because the system is associated with the reaction, and formability may be reduced. Accordingly, when surface roughness is adjusted by matte treatment, the sliding properties of the surface of the substrate protective layer 12 are improved, and the packaging material 10 can be easily prevented from overly adhering to the die during cold forming; thus, improved and even excellent formability is more likely to be ensured. Moreover, because a matte effect etc. can also be obtained by matte treatment, appearance designability can be imparted to the packaging material 10 by, for example, adjusting the amount of the filler.

Usable examples of the filler include fine particles of inorganic materials (inorganic fillers), such as silica, acrylic, alumina, barium sulfate, calcium carbonate, and titanium oxide; acrylic beads, urethane beads, and polyester beads (organic fillers); and the like. Of these, silica fine particles are preferable, because resin cracks (blushing due to fine cracks) are less likely to be formed during press molding of the packaging material. The mean particle size of the filler can be selected as necessary; however, because it is difficult to control the thickness of the packaging material for a power storage device, the filler size is preferably from submicron (nm order) to less than 10 μm. In this case, fillers having different particle size distributions may be blended. The mean particle size can be measured by a Coulter counter method.

The content ratio of the filler in the substrate protective layer 12 (the content ratio of the filler based on the total mass of the substrate protective layer 12) is preferably 1 to 50 mass %, and more preferably 5 to 50 mass %. Because the content ratio of the filler is set to 1 mass % or more, sliding properties can be easily imparted to the surface of the substrate protective layer 12. Moreover, because the content ratio of the filler is set to 50 mass % or less, film roughness of the surface of the substrate protective layer 12 can be easily prevented. Defects in the appearance of the surface of the packaging material 10 can thereby be prevented.

Examples of lubricants include fatty acid amides, such as oleic acid amide, erucic acid amide, stearic acid amide, behenic acid amide, ethylene bis-oleic acid amide, and ethylene bis-erucic acid amide. Preferable anti-blocking agents are various filler-based anti-blocking agents, such as silica.

The above additives may be used singly or in combination of two or more.

The thickness of the substrate protective layer 12 is selected depending on the required characteristics of the packaging material 10, and may be, for example, about 1 to 10 μm. If the thickness is less than 1 μm, the substrate protective effect tends to be insufficient, whereas if the thickness exceeds 10 μm, the substrate protective effect is sufficient, but the thickness is overly high, and influence on other characteristics as the packaging material may be a concern.

In the present embodiment, when a constant voltage of 100 V is applied for 3 minutes between the substrate protective layer 12 and the metal foil layer 14 in a state in which water is attached to the substrate protective layer 12, the insulation resistance between the layers is preferably 2000 MΩ or more, and more preferably 10000 MΩ or more. Thereby, for example, when a film that easily absorbs moisture (e.g., a Ny film) is used as the substrate layer, it is possible to reduce the possibility of the metal foil layer also being energized and affecting the battery capacity. In particular, in high-humidity environments or environments in which rain water flooding etc. may possibly occur, such as on-vehicle applications and power tool applications, the packaging material preferably has this level of insulating properties even in a state in which water is attached to the substrate protective layer. The insulation resistance between the substrate protective layer 12 and the metal foil layer 14 specifically refers to the insulation resistance of the laminated portion of the substrate protective layer 12, the substrate layer 11, the adhesive layer 13, and the metal foil layer 14. Anticorrosion treatment layers 15a and 15b may be provided on one surface or both surfaces of the metal foil layer 14, and the influence of the presence of these layers on the insulation resistance value is at an ignorable level.

(Adhesive Layer 13)

The adhesive layer 13 adheres the substrate layer 11 to the metal foil layer 14. The adhesive layer 13 has an adhesive force needed to firmly adhere the substrate layer 11 to the metal foil layer 14 and also has conformability (ability to reliably form the adhesive layer 13 on a member without separation, even when the member is deformed, stretched or contracted) to prevent breaking of the metal foil layer 14 by the substrate layer 11 during cold forming.

As an adhesive constituting the adhesive layer 13, there can be used a two-part curing type polyurethane adhesive comprising, for example, a main resin made of a polyol such as a polyester polyol, a polyether polyol, an acrylic polyol or the like, and a curing agent such as an aromatic or aliphatic isocyanate. In this adhesive, the molar ratio (=[NCO]/[OH]) of the isocyanate groups of the curing agent to the hydroxyl groups of the main resin is preferably in the range of 1 to 10, and more preferably 2 to 5.

After being applied, the polyurethane adhesive is aged at 40° C. for 4 days or longer, for example. The aging advances the reaction of the hydroxyl group of the main resin with the isocyanate group of the curing agent, allowing more firm adhesion of the substrate layer 11 to the metal foil layer 14.

From the perspective of obtaining desired adhesive strength, conformability, processability, and the like, the thickness of the adhesive layer 13 is preferably in the range of 1 to 10 μm, and more preferably 2 to 6 μm.

A suitable amount of pigment may be added to the adhesive layer 13 to impart designability. The pigment may be an organic pigment, an inorganic pigment, or a mixture of these pigments.

The type of pigment is not particularly limited within a range that does not impair the adhesion of the adhesive layer 13. Examples of organic pigments include azo-based pigments, phthalocyanine-based pigments, quinacridone-based pigments, anthraquinone-based pigments, dioxazine-based pigments, indigo-thioindigo-based pigments, perinone-perylene-based pigments, isoindolenine-based pigments, and the like; and examples of inorganic pigments include carbon black-based pigments, titanium oxide-based pigments, cadmium-based pigments, lead-based pigments, and chromium oxide-based pigments, as well as mica fine powder, fish scale foil, and the like.

Specific examples of organic pigments include the following pigments:

Yellow: isoindolinone, isoindoline, quinophthalone, anthraquinone (flavanthrone), azomethine, xanthene, etc.

Orange: diketo-pyrrolo-pyrrole, perylene, anthraquinone, perinone, quinacridone, etc.

Red: anthraquinone, quinacridone, diketo-pyrrolo-pyrrole, perylene, indigoid, etc.

Purple: oxazine (dioxazine), quinacridone, perylene, indigoid, anthraquinone, xanthene, benzimidazolone, violanthrone, etc.

Blue: phthalocyanine, anthraquinone, indigoid, etc.

Green: phthalocyanine, perylene, azomethine, etc.

Specific examples of inorganic pigments include the following pigments:

White: zinc white, lead white, lithopone, titanium dioxide, precipitated barium sulfate, baryta powder, etc.

Red: red lead, iron oxide red, etc.

Yellow: chrome yellow, zinc yellow (zinc yellow type 1, zinc yellow type 2), etc.

Blue: ultramarine blue, Prussian blue (potassium ferric ferrocyanide), etc.

Black: carbon black etc.

The content of pigment is preferably 1 mass % or more, and more preferably 5 mass % or more, based on the total mass of the adhesive layer 13, because higher reliability can be obtained. Moreover, the content of pigment is preferably 50 mass % or less, and more preferably 20 mass % or less, because improved and even excellent adhesion can be obtained.

(Metal Foil Layer 14)

Examples of the metal foil layer 14 include various types of metal foil such as of aluminum and stainless steel. The metal foil layer 14 is preferably aluminum foil from the perspective of processability, such as moisture resistance, ductility and malleability, and costs. The aluminum foil may be generally used soft aluminum foil, but aluminum foil containing iron is preferred for having good pinhole resistance, ductility and malleability.

The aluminum foil containing iron (100 mass %) preferably has an iron content in the range of 0.1 to 9.0 mass % and more preferably 0.5 to 2.0 mass %. The iron content of 0.1 mass % or more may lead to obtaining a packaging material 10 having better pinhole resistance, and ductility and malleability. The iron content of 9.0 mass % or less may lead to obtaining a packaging material 10 with better flexibility.

From the perspective of imparting desired ductility and malleability during forming, an annealed soft aluminum foil (e.g., aluminum foil made of the material 8021 or 8079 according to Japanese Industrial Standards) is even more preferred as the aluminum foil.

The metal foil used for the metal foil layer 14 is preferably degreased, for example, to obtain desired electrolyte resistance. To simplify the production procedure, the metal foil preferably has a surface that is not etched. The degreasing treatment, for example, may be of wet or dry type. However, dry degreasing treatment is preferred from the perspective of simplifying the production procedure.

An example of dry degreasing treatment may be one where treatment time is increased in the step of annealing the metal foil. Sufficient electrolyte resistance may be obtained with the degreasing treatment that is carried out simultaneously with the annealing treatment for softening the metal foil.

The dry degreasing treatment may be one, such as flame treatment and corona treatment, that is other than the annealing treatment. Further, the dry degreasing treatment may be one that oxidatively decomposes and removes contaminants using active oxygen generated by irradiating the metal foil with ultraviolet rays at a specific wavelength.

For example, the wet degreasing treatment may be acid degreasing treatment, alkaline degreasing treatment, or the like. Examples of the acid used for the acid degreasing treatment include inorganic acids, such as sulfuric acid, nitric acid, hydrochloric acid, and hydrofluoric acid. These acids may be used singly or in combination of two or more. For example, the alkali used for the alkaline degreasing treatment may be sodium hydroxide having a high etching effect. Alkaline degreasing treatment may be performed using a material formulated by adding a surfactant or the like to a weakly alkaline material. The wet degreasing treatment set forth above may be performed through immersion or spraying, for example.

From the perspective of barrier properties, pinhole resistance, and processability, the metal foil layer 14 preferably has a thickness in the range of 9 to 200 μm, more preferably 15 to 150 μm, and even more preferably 15 to 100 μm. The metal foil layer 14 with a thickness of 9 μm or more may be able to make the layer less breakable even when stress is applied thereto by molding. The metal foil layer 14 with a thickness of 200 μm or less may be able to curb the increase in mass of the packaging material and minimize the decrease in weight energy density of the power storage device.

(Anticorrosion Treatment Layers 15a and 15b)

The anticorrosion treatment layers 15a and 15b prevent or suppress corrosion of the metal foil layer 14 due to the electrolyte or hydrofluoric acid produced by reaction of the electrolyte with water. The anticorrosion treatment layer 15a increases the adhesive force between the metal foil layer 14 and the adhesive layer 13. The anticorrosion treatment layer 15b increases the adhesive force between the metal foil layer 14 and the sealant adhesive layer 16. The anticorrosion treatment layers 15a and 15b may be identically formed or may be differently formed.

The anticorrosion treatment layers 15a and 15b can be formed by, for example, applying degreasing treatment, hydrothermal conversion treatment, anodizing treatment, chemical conversion treatment, or coating-type anticorrosion treatment wherein a coating agent having anticorrosion ability is coated, or a combination of these treatments, to a layer serving as a base material for the anticorrosion treatment layers 15a and 15b.

Of the above treatments, the degreasing treatment, hydrothermal conversion treatment and anodizing treatment, particularly, the hydrothermal conversion treatment and the anodizing treatment, are ones wherein the metal foil (aluminum foil) is dissolved with a treating agent on the surface thereof to form a metal compound (aluminum compound (boehmite, alumite)) having good corrosion resistance. In this sense, these treatments may be embraced within the definition of chemical conversion treatments because they provide a co-continuous structure that is formed covering from the metal foil layer 14 to the anticorrosion treatment layers 15a and 15b.

Examples of the degreasing treatment include acid degreasing treatment and alkaline degreasing treatment. The acid degreasing treatment may be one using the inorganic acid mentioned above, such as sulfuric acid, nitric acid, hydrochloric acid, and hydrofluoric acid, singly or using an acid obtained by mixing them, or the like. Use of an acid degreasing agent, as the acid degreasing treatment, obtained by dissolving a fluorine-containing compound, such as monosodium ammonium bifluoride, with the above inorganic acid can not only achieve the degreasing effect of the metal foil layer 14, but form a passive state metal fluoride, and is thus effective in terms of hydrofluoric acid resistance. The alkaline degreasing treatment may be one using sodium hydroxide, or the like.

For example, the hydrothermal conversion treatment that can be used may be boehmite treatment of immersing the metal foil layer 14 in boiling water with triethanolamine added thereto. For example, the anodizing treatment that can be used may be alumite treatment. Examples of the chemical conversion treatment that can be used include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the aforementioned degreasing treatment is preferably performed in advance.

The chemical conversion treatment is not limited to a wet type, but may be one, for example, in which treatment agents used for the treatment are mixed with a resin component and applied. The anticorrosion treatment may preferably be of a coating type chromate treatment because it maximizes the anticorrosion effect and is convenient for liquid waste disposal.

The coating agent used in the coating type anticorrosion treatment wherein a coating agent having anticorrosion ability is applied includes one which contains at least one selected from the group consisting of a rare earth element oxide sol, an anionic polymer and a cationic polymer. Especially, a preferred method is one using a coating agent containing a rare earth element oxide sol.

The method using a coating agent containing a rare earth element oxide sol is a pure coating type anticorrosion treatment. When using this method, an anticorrosion effect can be imparted to the metal foil layer 14 even according to ordinary coating methods. The layer formed by use of a rare earth element oxide sol has an anticorrosion effect (inhibitor effect) on the metal foil layer 14 and these sols are favorable materials from an environmental aspect.

The rare earth element oxide sol contains microparticles (e.g., particles having a mean particle size of 100 nm or less) of rare earth element oxide dispersed in a liquid dispersion medium. As the rare earth element oxide, mention can be made of cerium oxide, yttrium oxide, neodymium oxide, lanthanum oxide, or the like. Cerium oxide is preferred among them. This allows more improvement in adhesion with the metal foil layer 14. Examples of the liquid dispersion medium used for the rare earth element oxide sol include various solvents, such as, water, alcoholic solvents, hydrocarbon-based solvents, ketone-based solvents, ester-based solvents, and ether-based solvents. Water is preferred among them. The rare earth element oxides contained in the anticorrosion treatment layers 15a and 15b may be used singly or in combination of two or more.

To stabilize dispersion of the rare earth element oxide particles, the rare earth element oxide sol preferably contains a dispersion stabilizer, including an inorganic acid, such as nitric acid, hydrochloric acid, or phosphoric acid, an organic acid, such as acetic acid, malic acid, ascorbic acid, or lactic acid, a salt of these acids, or the like. Of these dispersion stabilizers, phosphoric acid or phosphate in particular is preferably used. In addition to stabilizing dispersion of the rare earth element oxide particles, use of these materials achieves such effects, in the usage of the packaging material for a power storage device, as improving adhesion to the metal foil layer 14 with the chelating ability of phosphoric acid, imparting electrolyte resistance by trapping metal ions eluted due to the influence of hydrofluoric acid (forming a passive state), improving cohesive force of the rare earth element oxide layer due to the ease of producing dehydration condensation of phosphoric acid even at low temperatures, and the like. Examples of the phosphoric acid or phosphate used as the dispersion stabilizer include orthophosphoric acid, pyrophosphoric acid, metaphosphoric acid, alkali metal salt or ammonium salt thereof, and the like. Of these materials, condensed phosphoric acid, such as trimetaphosphoric acid, tetrametaphosphoric acid, hexametaphosphoric acid, and ultra-metaphosphoric acid, or alkali metal salt or ammonium salt thereof is preferred in terms of allowing the packaging material for a power storage device to express its function. In particular, considering the dry film formability (drying capacity, heat capacity) when forming a layer containing rare earth oxide through various types of coating method using a coating composition containing the rare earth element oxide sol, an agent having good reactivity at low temperatures is preferred. Specifically, a sodium salt is preferred because of its good dehydration condensation properties at low temperatures. As the phosphate, a water-soluble salt is preferred. Phosphoric acids or phosphates contained in the anticorrosion treatment layers 15a and 15b may be used singly or in combination of two or more.

Phosphoric acid or salt thereof is blended in the rare earth element oxide sol preferably in an amount of 1 part by mass or more, and more preferably 5 parts by mass or more, relative to 100 parts by mass of rare earth element oxide. A content of 1 part by mass or more can achieve good stability of the sol and easily satisfy the function as the packaging material for a power storage device. The upper limit of phosphoric acid or salt thereof to be blended relative to 100 parts by mass of rare earth element oxide may be in a range not lowering the function of the rare earth element oxide sol, and may preferably be 100 parts by mass or less, more preferably 50 parts by mass or less, and even more preferably 20 parts by mass or less, relative to 100 parts by mass of rare earth element oxide.

The layer formed from the rare earth element oxide sol is an aggregate of inorganic particles and therefore the cohesive force of the layer is low even after a dry curing step. To improve the cohesive force of this layer, complexing with an anionic polymer is favorable.

A specific example of the anionic polymer may be a polymer having a carboxyl group, examples of which include poly(meth)acrylic acid (or a salt thereof) and copolymers having poly(meth)acrylic acid as a main component thereof. Examples of the copolymerization component of the copolymers include: alkyl(meth)acrylate-based monomers (of which examples of alkyl groups include a methyl group, an ethyl group, an n-propyl group, an i-propyl group, an n-butyl group, an i-butyl group, a t-butyl group, a 2-ethylhexyl group, and a cyclohexyl group); amide group-containing monomers, such as (meth)acrylamide, N-alkyl(meth)acrylamide, N,N-dialkyl(meth)acrylamide (of which examples of alkyl groups include a methyl group, an ethyl group, an n-propyl group, an i-propyl group, an n-butyl group, an i-butyl group, a t-butyl group, a 2-ethylhexyl group, and a cyclohexyl group), N-alkoxy(meth)acrylamide, N,N-dialkoxy(meth)acrylamide (of which examples of alkoxy groups include a methoxy group, an ethoxy group, a butoxy group, and an isobutoxy group), N-methylol(meth)acrylamide, and N-phenyl(meth)acrylamide; hydroxyl group-containing monomers, such as 2-hydroxyethyl(meth)acrylate and 2-hydroxypropyl(meth)acrylate; glycidyl group-containing monomers, such as glycidyl(meth)acrylate and allyl glycidyl ether; silane-containing monomers, such as (meth)acryloxypropyl trimethoxysilane and (meth)acryloxypropyl triethoxysilane; and isocyanate group-containing monomers, such as (meth)acryloxypropyl isocyanate. The examples also include styrene, α-methylstyrene, vinyl methyl ether, vinyl ethyl ether, maleic acid, alkyl maleate monoester, fumaric acid, alkyl fumarate monoester, itaconic acid, alkyl itaconate monoester, (meth)acrylonitrile, vinylidene chloride, ethylene, propylene, vinyl chloride, vinyl acetate, and butadiene.

The anionic polymer improves the stability of the anticorrosion treatment layers 15a and 15b (oxide layers) obtained using the rare earth element oxide sol. This is achieved by the effect of protecting the hard and brittle oxide layers with an acrylic resin component, and the effect of capturing ionic contamination (particularly, sodium ion) derived from the phosphate contained in the rare earth oxide sol (cation catcher). In other words, when alkali metal ion or alkaline earth metal ion, such as sodium in particular, is contained in the anticorrosion treatment layers 15a and 15b obtained by use of the rare earth element oxide sol, the anticorrosion treatment layers 15a and 15b are prone to deteriorate starting from the ion-containing site. Accordingly, sodium ion or the like contained in the rare earth oxide sol is immobilized by use of the anionic polymer to thereby improve durability of the anticorrosion treatment layers 15a and 15b.

The anticorrosion treatment layers 15a and 15b produced by combining the anionic polymer with the rare earth element oxide sol have anticorrosion ability equivalent to that of the anticorrosion treatment layers 15a and 15b formed by applying chromate treatment to the metal foil layer 14. The anionic polymer preferably has a structure where a substantially water soluble polyanionic polymer is cross-linked. For example, the cross-linking agent used for forming this structure may be a compound having an isocyanate group, a glycidyl group, a carboxy group, or an oxazoline group. A silane coupling agent may be used for introducing a cross-linking site having a siloxane bond.

Examples of the compound having an isocyanate group include: diisocyanates such as tolylene diisocyanate, xylylene diisocyanate or its hydrogenated product, hexamethylene diisocyanate, 4,4'-diphenylmethane diisocyanate or its hydrogenated product, and isophorone diisocyanate; polyisocyanates including adducts of these isocyanates reacted with polyhydric alcohols such as trimethylolpropane, biuret forms obtained by reaction of the isocyanates with water, or isocyanurate forms that are trimers of the isocyanates; or blocked polyisocyanates obtained by blocking these polyisocyanates with alcohols, lactams, oximes and the like.

Examples of the compound having a glycidyl group include: epoxy compounds obtained by reaction of glycols, such as ethylene glycol, diethylene glycol, triethylene glycol, polyethylene glycol, propylene glycol, dipropylene glycol, tripropylene glycol, polypropylene glycol, 1,4-butadiene, 1,6-hexanediol, and neopentyl glycol, with epichlorohydrin; epoxy compounds obtained by reaction of polyhydric alcohols, such as glycerine, polyglycerine, trimethylolpropane, pentaerythritol, and sorbitol, with epichlorohydrin; and epoxy compounds obtained by reaction of dicarboxylic acids, such as phthalic acid, terephthalic acid, oxalic acid, and adipic acid, with epichlorohydrin.

The compounds having a carboxy group include various aliphatic or aromatic dicarboxylic acids, and include, further, poly(meth)acrylic acids, or alkali (earth) metal salts of poly(meth)acrylic acids.

The compounds having an oxazoline group include, for example, low molecular weight compounds having two or more oxazoline units. Alternatively, where polymerizable monomers such as isopropenyl oxazoline are used, mention may be made of compounds obtained by copolymerizing acrylic monomers such as (meth)acrylic acid, (meth)acrylic alkyl esters, hydroxyalkyl (meth)acrylates and the like.

The silane coupling agents include γ-glycidoxypropyltrimethoxysilane, γ-glycidoxypropyltriethoxysilane, β-(3,4-epoxycyclohexyl)ethyltrimethoxysilane, Δ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropylethoxysilane. Especially, when the reactivity with an anionic polymer is considered, an epoxysilane, an aminosilane and an isocyanate silane are preferred.

The cross-linking agent is blended in an amount preferably in the range of 1 to 50 parts by mass, and more preferably from 10 to 20 parts by mass, relative to 100 parts by mass of the anionic polymer. When the ratio of the cross-linking agent is 1 part by mass or more relative to 100 parts by mass of the anionic polymer, a cross-linking structure is easily sufficiently formed. When the ratio of the cross-linking agent is 50 parts by mass or less relative to 100 parts by mass of the anionic polymer, the pot life of the coating agent improves.

The method of cross-linking the anionic polymer is not limited to the use of the aforementioned cross-linking agents, but may be one using a titanium or zirconium compound to form ionic crosslinkage. The coating composition forming the anticorrosion treatment layer 15a may be applied to these materials.

The anticorrosion treatment layers 15a and 15b described above are formed as chemical conversion treatment layers on the metal foil layer 14 using chemical conversion treatment, typical of which is chromate treatment. To form a graded structure in association with the metal foil layer 14, the metal foil layer 14 is treated, in the chemical conversion treatment, with a chemical conversion treatment agent, which is particularly formulated with addition of hydrofluoric acid, hydrochloric acid, nitric acid, sulfuric acid or a salt thereof. The treated metal foil layer 14 is then reacted with a chromium or non-chromium compound to form the chemical conversion treatment layers on the metal foil layer 14. However, the chemical conversion treatment using the acid as the chemical conversion treatment agent may entail environmental degradation and corrosion of the coating apparatus.

In contrast, the anticorrosion treatment layers 15a and 15b of coating type as mentioned above do not have to form a graded structure with respect to the metal foil layer 14, unlike in the chemical conversion treatment typical of which is chromate treatment. Accordingly, the nature of the coating agent should not be restricted to acidic, alkaline, or neutral ones, or the like, and accordingly a good work environment is achieved. In addition, an alternative to chromate treatment using a chromium compound is sought in terms of environmental health. From this perspective as well, the anticorrosion treatment layers 15a and 15b of coating type are preferred.

The anticorrosion treatment layers 15a and 15b may have a laminated structure in which a cationic polymer is further laminated as needed. The cationic polymer may be polyethyleneimine, an ionic polymer complex made of a polyethyleneimine and a polymer having carboxylic acid, a primary amine-grafted acrylic resin having a primary amine grafted to a main acrylic backbone, polyallylamine and derivatives thereof, or an aminophenol resin.

Examples of the "polymer having carboxylic acid" forming the ionic polymer complex include polycarboxylic acid (salt), a copolymer produced by introducing a comonomer into polycarboxylic acid (salt), and polysaccharides having a carboxy group. Examples of the polycarboxylic acid (salt) include polyacrylic acid, and ionic salts thereof. Examples of the polysaccharides having a carboxy group include carboxymethylcellulose, and ionic salts thereof. Examples of the ionic salt include an alkali metal salt, and alkaline earth metal.

The primary amine-grafted acrylic resin is a resin having a primary amine grafted to a main acrylic backbone. The acrylic main backbone may include various monomers, such as poly(meth)acrylic acid, used for the acrylic polyol mentioned above. The primary amine grafted to the acrylic main backbone may be ethyleneimine or the like.

The polyallylamine or a derivative thereof that can be used may be a homopolymer or a copolymer of allylamine, allylamine amide sulfate, diallylamine, dimethylallylamine, and the like. These amines may be used in the form of free amine, or may be stabilized by acetic acid or hydrochloric acid. The copolymer may contain maleic acid, sulfur dioxide, or the like as a component. A type of amine imparted with thermal cross-linking properties by partially methoxylating a primary amine may be used. These cationic polymers may be used singly or in combination of two or more. Of these cationic polymers, at least one selected from the group consisting of polyallylamine and a derivative thereof is preferred.

The cationic polymer is preferably used in combination with a cross-linking agent having a functional group capable of reacting with amine/imine, such as a carboxy group or a glycidyl group. The cross-linking agent to be used in combination with the cationic polymer may be a polymer having carboxylic acid that forms an ionic polymer complex with polyethyleneimine, of which examples include: polycarboxylic acid (salt), such as polyacrylic acid or ionic salt thereof; a copolymer produced by introducing a comonomer thereinto; and polysaccharides having a carboxy group, such as carboxymethylcellulose or ionic salt thereof.

In the present embodiment, a cationic polymer is described as a component constituting the anticorrosion treatment layers 15a and 15b. This is based on an intensive investigation using various compounds to find ones imparting electrolyte resistance and hydrofluoric acid resistance to the packaging material for a power storage device as required thereof. As a result, cationic polymers have been found to be compounds that are capable of imparting electrolyte resistance and hydrofluoric acid resistance. This is believed to be because damage to the metal foil layer 14 is suppressed and reduced by capturing fluoride ion with the cationic group (anion catcher). The cationic polymer is also quite preferred from the perspective of improving adhesion between the anticorrosion treatment layer 15b and the sealant adhesive layer 16. Since the cationic polymer is water soluble similar to the anionic polymer mentioned above, water resistance is improved by forming a cross-linking structure using the cross-linking agent mentioned above. Thus, a cross-linking structure can also be formed by using the cationic polymer. Accordingly, when the rare earth oxide sol is used for forming the anticorrosion treatment layers 15a and 15b, the cationic polymer may be used as the protective layer instead of the anionic polymer.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+ anionic polymer: laminated composite)/cationic polymer (multilayer), (7) (rare earth oxide sol+cationic polymer: laminated composite)/anionic polymer (multilayer), and the like. Of these combinations, (1) and (4) through (7) are preferred and (4) through (7) are more preferred. For the anticorrosion treatment layer 15a, (6) is particularly preferred because an anticorrosion effect and an anchor effect (adhesion improvement effect) are achieved by a single layer. For the anticorrosion treatment layer 15b, (6) and (7) are particularly preferred because it is easier to keep the sealant layer 17 side electrolyte resistance. However, the present embodiment should not be limited to the above combinations. An example of selecting the anticorrosion treatment is as follows. Specifically, when the sealant adhesive layer 16 is formed of a modified polyolefin resin, the cationic polymer is designed to be provided on the surface contacting the sealant adhesive layer 16 (e.g., configurations (5) and (6)) since the cationic polymer is a material quite preferable in terms of good adhesion with a modified polyolefin resin that will be mentioned in the sealant adhesive layer 16 below.

The anticorrosion treatment layers 15a and 15b are not limited to the layers described above. For example, they may be formed by using an agent produced by blending phosphoric acid and a chromium compound into a resin binder (aminophenol resin etc.), as in a coating type chromate based on a known technique. Use of this treatment agent enables formation of a layer that is both corrosion-resistant and adhesive. To improve adhesion, the chemical conversion treatment layer described above (the layer formed through degreasing treatment, hydrothermal conversion treatment, anodizing treatment, chemical conversion treatment, or a combination thereof) may be treated in a composite manner using the cationic polymer and/or the anionic polymer mentioned above. Alternatively, using these treatments in combination, the cationic polymer and/or the anionic polymer may be laminated as a multilayer structure. While the stability of the coating agent has to be considered, a layer that is both corrosion-resistant and adhesive can be achieved by using a coating agent that is a one-liquid product of the rare earth oxide sol and the cationic polymer or the anionic polymer obtained in advance.

The anticorrosion treatment layers 15a and 15b preferably have mass per unit area in the range of 0.005 to 0.200 g/m$^2$, and more preferably 0.010 to 0.100 g/m$^2$. When 0.005 g/m$^2$ or more, the metal foil layer 14 can be easily made corrosion-resistant. The mass per unit area exceeding 0.200 g/m$^2$ will saturate the anticorrosivity and make little change therein. In contrast, when the rare earth oxide sol is used, a thick coating may cause insufficient thermal curing during drying and decrease the cohesive force. Although the above description is given using mass per unit area, the specific gravity, if available, can be used in terms of thickness.

The respective thicknesses of the anticorrosion treatment layers 15a and 15b are preferably, for example, in the range of 10 nm to 5 μm, and more preferably 20 to 500 nm, from the perspective of corrosion-resistant and anchoring functions.

(Sealant Adhesive Layer 16)

The sealant adhesive layer 16 adheres the sealant layer 17 to the metal foil layer 14 formed with the anticorrosion treatment layer 15b. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft modifying a polyolefin-based resin with acid. The acid modified polyolefin-based resin, which has a polar group introduced into part of the nonpolar polyolefin-based resin, can firmly adhere to both the sealant layer 17 composed of a nonpolar polyolefin-based resin film or the like, and the anticorrosion treatment layer 15b mostly having polarity. Use of the acid modified polyolefin-based resin improves resistance of the packaging material 10 to the contents, such as the electrolyte, and easily prevents lowering of the adhesive force due to deterioration of the sealant adhesive layer 16 even when hydrofluoric acid is produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin that can be used may also be a copolymer obtained by copolymerizing polar molecules such as of acrylic acid or methacrylic acid with those materials mentioned above, a polymer such as cross-linked polyolefin, or the like. The acid to modify the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the aforementioned adhesive component with an extruder. The sealant adhesive layer 16 of the heat lamination structure preferably has a thickness in the range of 8 to 50 μm.

The adhesive component forming the sealant adhesive layer 16 of the dry lamination structure may be ones, for example, similar to those mentioned for the adhesive layer 13. In this case, to prevent or reduce swelling due to the electrolyte, and hydrolysis due to hydrofluoric acid, the composition of the adhesive is preferably designed so as to contain a main resin with a backbone not easily hydrolyzed and improve cross-linking density.

To improve cross-linking density, some substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid is obtained by dimerizing various unsaturated fatty acids, and can have a structure, for example, of acyclic type, monocyclic type, polycyclic type, and aromatic ring type.

The fatty acid as a starter of the dimer fatty acid is not particularly limited. With such dimer fatty acid as being an essential component, a dibasic acid such as that used for ordinary polyester polyol may be introduced. The curing agent that can be used for the main resin forming the sealant adhesive layer 16 may be, for example, an isocyanate compound that may also be used as a chain elongation agent for polyester polyol. Thus, cross-linking density of the adhesive coating increases, which leads to improving solubility and swelling properties. Also, substrate adhesion is also expected to be improved due to increase in urethane group concentration.

The sealant adhesive layer 16 having the dry laminate structure has a bonding part such as of an ester group and a urethane group which is easily hydrolysable. Therefore, for usage requiring much higher reliability, an adhesive component having a heat lamination structure is preferably used as the sealant adhesive layer 16. For example, the various curing agents mentioned above are blended into a coating agent wherein the acid modified polyolefin resin is dissolved or dispersed in a solvent, such as toluene or methylcyclohexane (MCH), followed by application and drying to thereby form the sealant adhesive layer 16.

When forming the sealant adhesive layer 16 using extrusion molding, the adhesion resin tends to be oriented in MD (extrusion direction) due to the stress or the like generated during the extrusion molding. In this case, to alleviate the anisotropy of the sealant adhesive layer 16, an elastomer may be blended in the sealant adhesive layer 16. As the elastomer to be blended in the sealant adhesive layer 16, for example, an olefin-based elastomer, a styrene-based elastomer, or the like may be used.

The elastomer preferably has a mean particle size that can improve the compatibility of the elastomer with the adhesive resin and improve the effect of alleviating the anisotropy of the sealant adhesive layer 16. Specifically, the mean particle size of the elastomer is preferably 200 nm or less, for example.

The mean particle size of the elastomer is determined by, for example, capturing an enlarged image of a cross section of an elastomer composition using an electron microscope, followed by image analysis for the measurement of a mean particle size of dispersed cross-linked rubber components. The elastomers mentioned above may be used singly or in combination of two or more.

If an elastomer is blended in the sealant adhesive layer 16, the amount of the elastomer added to the sealant adhesive layer 16 (100 mass %) is, for example, preferably in the range of 1 to 25 mass % and more preferably 10 to 20 mass %. When the blending amount of the elastomer is 1 mass % or more, improvement is likely to be achieved in compatibility with the adhesion resin, and also in the effect of alleviating the anisotropy of the sealant adhesive layer 16. When the blending amount of the elastomer is 25 mass % or less, improvement is likely to be achieved in the effect of preventing or reducing swelling of the sealant adhesive layer 16 due to the electrolyte.

The sealant adhesive layer 16 may be, for example, a dispersed adhesive resin solution in which an adhesive resin is dispersed in an organic solvent.

The sealant adhesive layer 16 when provided to the heat lamination structure preferably has a thickness in the range of 8 to 50 µm, and more preferably 20 to 40 µm. The sealant adhesive layer 16 having a thickness of 8 µm or more can easily obtain sufficient adhesion strength between the metal foil layer 14 and the sealant layer 17. The sealant adhesive layer 16 having a thickness of 50 µm or less can easily reduce the amount of water penetrating from an end surface of the packaging material into the battery element in the interior. The sealant adhesive layer 16 when provided to the dry lamination structure preferably has a thickness in the range of 1 to 5 µm. The sealant adhesive layer 16 having a thickness of 1 µm or more can easily obtain sufficient adhesion strength between the metal foil layer 14 and the sealant layer 17. The sealant adhesive layer 16 having a thickness of 5 µm or less is capable of preventing or reducing cracking therein.

(Sealant Layer 17)

The sealant layer 17 imparts sealability to the packaging material 10 when heat sealed, and is located on the inward side for heat sealing when the power storage device is assembled. The sealant layer 17 may be a resin film made of a polyolefin-based resin or an acid-modified polyolefin-based resin obtained by graft-modifying a polyolefin-based resin with acid such as maleic anhydride. Of these materials, a polyolefin-based resin that improves the barrier properties against water vapor and is capable of forming the shape of the power storage device without being excessively deformed by heat sealing is preferred, and polypropylene is particularly preferred.

Examples of the polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

Some substance may be added to the above types of polypropylenes, that is, random polypropylene, homo polypropylene, and block polypropylene, the substance being a low crystallinity ethylene-butene copolymer, a low crystallinity propylene-butene copolymer, terpolymer formed of a three-component copolymer of ethylene, butene, and propylene, an anti-blocking agent (AB agent), such as silica, zeolite, and acrylic resin beads, a slip agent, such as a fatty acid amide, or the like.

The acid-modified polyolefin-based resin includes, for example, those resins which are similar to ones mentioned in the sealant adhesive layer 16.

The sealant layer 17 may be a single layer film or may be a multilayer film, which may be selected according to the required ability. For example, to impart moisture resistance, a multilayer film with interposition of resins, such as an ethylene-cyclic olefin copolymer and polymethylpentene, may be used.

The sealant layer 17 may contain various additives, such as a flame retardant, a slip agent, an anti-blocking agent, an antioxidant, a photostabilizer, and a tackifier.

A heat sealable film formed by extrusion may be used as the sealant layer 17. In this case, the orientation of the sealable film tends to conform to the direction of its extrusion. Therefore, from the perspective of alleviating the anisotropy of the sealant layer 17 due to the orientation, an elastomer may be blended in the heat sealable film. Blending an elastomer, blushing of the sealant layer 17 is prevented or reduced when the packaging material 10 for a power storage device is cold-formed for formation of a recess.

The elastomer that can be used for forming the sealant layer 17 may be, for example, the same materials as those mentioned as the elastomer forming the sealant adhesive layer 16. When the sealant layer 17 has a multilayer film structure, at least one of the plurality of layers constituting the multilayer film structure may be configured to contain the elastomer. For example, when the sealant layer 17 has a three-layer laminated structure of random polypropylene layer/block polypropylene layer/random polypropylene layer, the elastomer may be blended in only the block polypropylene layer or only in the random polypropylene layers, or may be blended in both the random polypropylene layers and the block polypropylene layer.

The sealant layer 17 may contain a lubricant to impart lubricity thereto. Then, when a recess is formed in the packaging material 10 for a power storage device by cold forming, the sealant layer 17 containing a lubricant can prevent the packaging material 10 from being stretched more than necessary in the areas to be shaped into side portions and corners of the recess where the stretching degree is high. This can prevent separation between the metal foil layer 14 and the sealant adhesive layer 16, or prevent breaking and blushing due to cracks in the sealant layer 17 and the sealant adhesive layer 16.

When the sealant layer 17 contains a lubricant, the content in the sealant layer 17 (100 mass %) is preferably in the range of 0.001 to 0.5 mass %. When the content of lubricant is 0.001 mass % or more, blushing of the sealant layer 17 is likely to be further reduced during cold forming. When the content of lubricant is 0.5 mass % or less, lowering in adhesion strength is likely to be minimized with respect to a surface of another layer contacting a surface of the sealant layer 17.

The sealant layer 17 preferably has a thickness in the range of 10 to 100 μm, and more preferably 20 to 60 μm. The sealant layer 17 with a thickness of 20 μm or more achieves sufficient heat sealing strength. The sealant layer 17 with a thickness of 60 μm or less reduces the amount of water vapor penetration from an end of the packaging material.

[Method for Manufacturing Packaging Material]

A method for manufacturing the packaging material 10 will be described. The method for manufacturing the packaging material 10 is not limited to the following method.

For example, the method for manufacturing the packaging material 10 may be a method including the following steps S11 to S14.

Step S11: Forming the anticorrosion treatment layer 15a on a surface of a metal foil layer 14 and forming the corrosion inhibition treatment layer 15b on the other surface of the metal foil layer 14.

Step S12: Bonding a surface of the anticorrosion treatment layer 15a which faces away from the metal foil layer 14 to the substrate layer 11 via the adhesive layer 13.

Step S13: Forming the substrate protective layer 12 on a surface of the substrate layer 11 which faces away from the adhesive layer 13.

Step S14: Forming the sealant layer 17 on a surface of the anticorrosion treatment layer 15b which faces away from the metal foil layer 14 via the sealant adhesive layer 16.

(Step S11)

At step S11, the anticorrosion treatment layer 15a is formed on a surface of the metal foil layer 14 and the anticorrosion treatment layer 15b is formed on the other surface of the metal foil layer 14. The anticorrosion treatment layers 15a and 15b may be formed separately or simultaneously. Specifically, for example, an anticorrosion treatment agent (base material of the anticorrosion treatment layers) is applied to both surfaces of the metal foil layer 14, followed by drying, curing, and baking sequentially to simultaneously form the anticorrosion treatment layers 15a and 15b. Alternatively, an anticorrosion treatment agent may be applied to a surface of the metal foil layer 14, sequentially followed by drying, curing, and baking to form the anticorrosion treatment layer 15a. Then, the anticorrosion treatment layer 15b may be similarly formed on the other surface of the metal foil layer 14. The order of forming the anticorrosion treatment layers 15a and 15b is not particularly limited. The anticorrosion treatment agent to be used may be different or the same between the anticorrosion treatment layers 15a and 15b. As the anticorrosion treatment agent, for example, one for coating type chromate treatment, or the like may be used. Examples of the method of applying the anticorrosion treatment include, but are not particularly limited to, gravure coating, gravure reverse coating, roll coating, reverse roll coating, die coating, bar coating, kiss coating, and comma coating. As the metal foil layer 14, an untreated metal foil layer may be used, or a metal foil layer subjected to wet or dry degreasing treatment may be used.

(Step S12)

At step S12, a surface of the anticorrosion treatment layer 15a which faces away from the metal foil layer 14 is bonded to the substrate layer 11 by dry lamination or the like using an adhesive forming the adhesive layer 13. At step S13, aging treatment may be performed at a temperature in the range of room temperature to 100° C. to accelerate adhesion. Aging time is, for example, 1 to 10 days.

(Step S13)

At step S13, the substrate protective layer 12 is formed on a surface of the substrate layer 11 which faces away from the adhesive layer 13. First, a raw material for forming the substrate protective layer 12 (a coating agent prepared by mixing a polyisocyanate with a polyester resin diluted with a solvent) is prepared. Then, the coating agent is applied to the substrate layer 11 using a known method, and dried by heating. Examples of such a coating method include gravure direct coating, gravure reverse coating (direct coating, kiss coating), bar coater coating, and the like. When the filler mentioned above is mixed, a slurry prepared by previously dispersing the filler in a solvent may be mixed with a varnished resin, or the filler may be directly dispersed in an already varnished resin coating agent. It is also possible to mix other additives, such as a curing agent, into these filler-mixed liquids. The timing of forming the substrate protective layer 12 is not limited to the present embodiment.

(Step S14)

Following step S13, the sealant layer 17 is formed, via the sealant adhesive layer 16, on a surface of the anticorrosion treatment layer 15b which faces away from the metal foil layer 14, in the laminate having the substrate protective layer 12, the substrate layer 11, the adhesive layer 13, the anticorrosion treatment layer 15a, the metal foil layer 14, and the anticorrosion treatment layer 15b laminated in this order. The sealant layer 17 may be laminated by dry lamination, sandwich lamination, or the like, or may be laminated together with the sealant adhesive layer 16 by coextrusion. To improve adhesion, the sealant layer 17 is preferably laminated by, for example, sandwich lamination or laminated together with the sealant adhesive layer 16 by coextrusion, and is more preferably laminated by sandwich lamination.

The packaging material 10 is obtained through the steps S11 to S14 described above. The order of steps in the method for manufacturing the packaging material 10 is not limited to that of the above method where steps S11 to S14 are sequentially performed. The order of steps may be appropriately changed. For example, step S12 may be followed by step S11.

[Power Storage Device]

A power storage device provided with the packaging material 10 as a container will be described. The power storage device includes: a battery element 1 including electrodes; leads 2 extending from the electrodes; and a container holding the battery element 1. The container is formed of the packaging material 10 for a power storage device, with the sealant layer 17 inside. The container may be obtained by overlapping two packaging materials with the sealant layers 17 face-to-face, and heat-sealing the edge portions of the overlapped packaging materials 10, or may be obtained by folding a single packaging material so that the surfaces are overlapped with each other and similarly heat-sealing the edge portions of the packaging material 10. The power storage device may have the packaging material 20 as a container. The packaging material of the present embodiment can be used for various power storage devices. Examples of the power storage device include secondary batteries, such as lithium ion batteries, nickel hydride batteries, and lead batteries, and electrochemical capacitors, such as electric double layer capacitors.

The leads 2 are sandwiched and hermetically sealed by the packaging material 10 forming the container with the sealant layer 17 inside. The leads 2 may be sandwiched by the packaging material 10 via a tab sealant.

[Method for Manufacturing Power Storage Device]

Figure 2A:
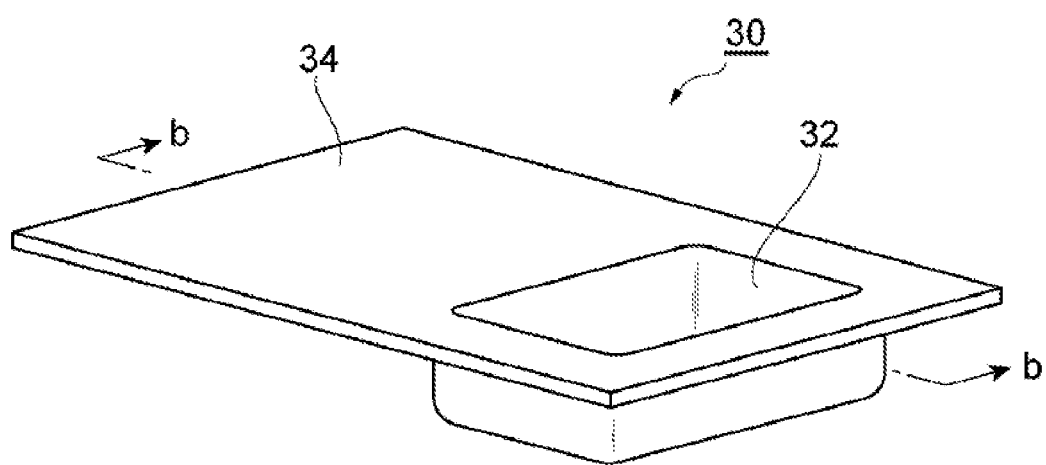
FIGS. 2A and 2B are a set of diagrams illustrating an embossed packaging material obtained using the power storage device packaging material according to an embodiment of the present invention, with FIG. 2A being a perspective view of the embossed packaging material, and FIG. 2B being a vertical cross-sectional view of the embossed packaging material shown in FIG. 2A taken along the line b-b.
Figure 2B:
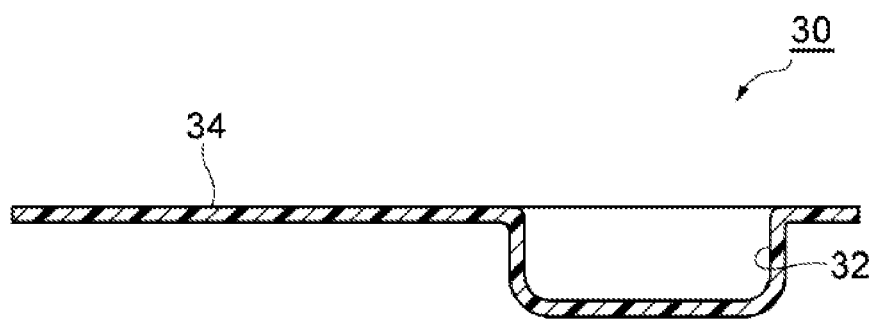

A method for manufacturing the power storage device using the packaging material 10 will be described. The description herein is given taking as an example of the case of producing a secondary battery 40 using an embossed packaging material 30. FIGS. 2A and 2B show a set of diagrams each illustrating the embossed packaging material 30. FIGS. 3A, 3B, 3C, and 3D show a set of diagrams, each being a perspective view of a production procedure of a single-sided battery using the packaging material 10. The secondary battery 40 may be a double-sided battery produced by providing two packaging materials similar to the embossed packaging material 30, and bonding the packaging materials to each other while alignment is adjusted. The embossed packaging material 30 may be formed using a packaging material 20.

The secondary battery 40, which is a single-sided battery, can be produced through steps S21 to S25 below, for example.

Step S21: Preparing the packaging material 10, the battery element 1 including electrodes, and the leads 2 extending from the electrodes.

Step S22: Forming a recess 32 for disposing the battery element 1 therein on a surface of the packaging material 10 (see FIG. 3A and FIG. 3B).

Figure 3A:
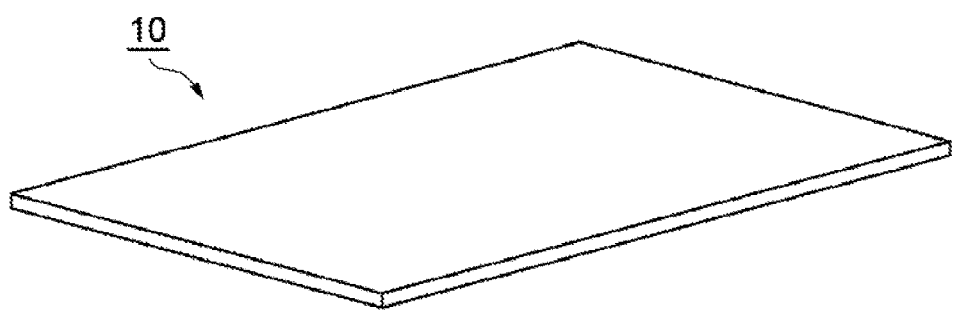
FIGS. 3A, 3B, 3C, and 3D are a set of perspective views illustrating a process of producing a secondary battery using the power storage device packaging material according to an embodiment of the present invention, with FIG. 3A showing the power storage device packaging material, FIG. 3B showing the power storage device packaging material that has been embossed, and a battery element, FIG. 3C showing the power storage device packaging material that has been folded with an end portion being heat-sealed, and FIG. 3D showing a state in which both sides of the folded portion are turned up.
Figure 3B:
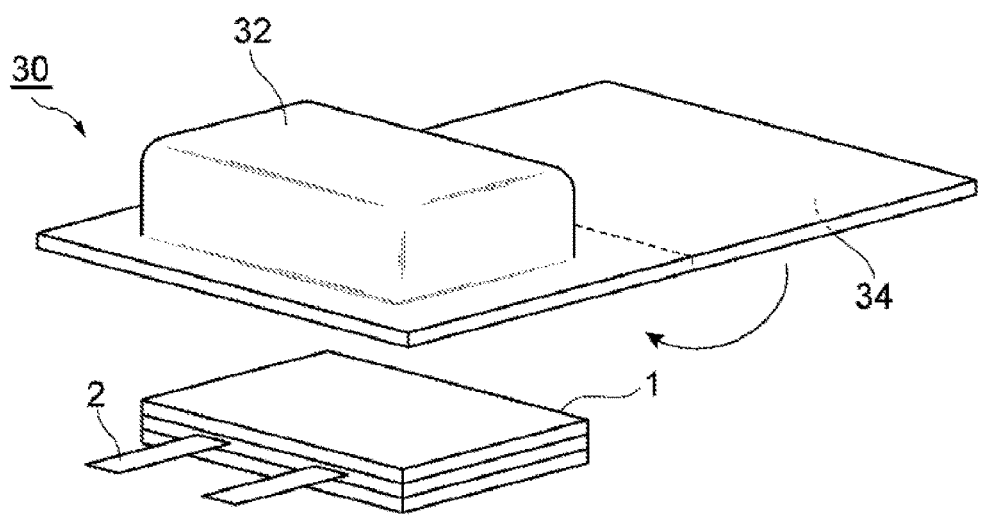
Figure 3C:
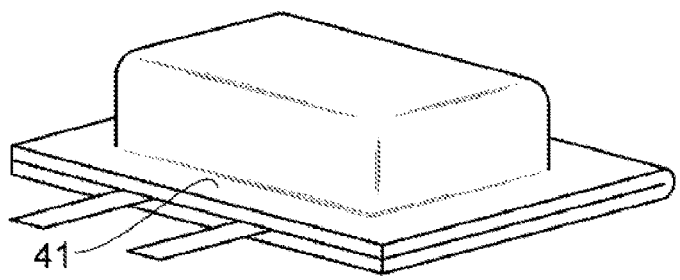
Figure 3D:
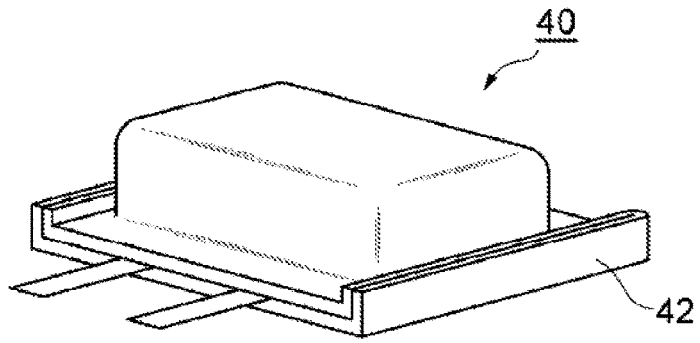

Step S23: Disposing the battery element 1 in the shaped area (recess 32) of the embossed packaging material 30, folding the embossed packaging material 30, with the surfaces being overlapped, so as to cover the recess 32 with a cover portion 34, and pressure heat-sealing one side of the embossed packaging material 30 so as to sandwich the leads 2 extending from the battery element 1 (FIG. 3B and FIG. 3C).

Step S24: Pressure heat-sealing other sides, leaving the side sandwiching the leads 2 unsealed, followed by injecting an electrolyte solution from the unsealed side and pressure heat-sealing the unsealed side in a vacuum (see FIG. 3C).

Step S25: Trimming the end portions of the pressure heat-sealed sides except for the side sandwiching the leads 2, and bending the end portions toward the shaped area (recess 32) (see FIG. 3D).

(Step S21)

At step S21, the packaging material 10, the battery element 1 including electrodes, and the leads 2 extending from the electrodes are prepared. The packaging material 10 is prepared based on the embodiment described above. The battery element 1 and the leads 2 are not particularly limited, but a known battery element 1 and known leads 2 may be used.

(Step S22)

At step S22, the recess 32 for arranging the battery element 1 is formed on the sealant layer 17 side of the packaging material 10. The recess 32 has a shape, such as a rectangular shape in plan view, conforming to the shape of the battery element 1. The recess 32 is formed by, for example, pressing a pressing member having a rectangular pressing surface against part of the packaging material 10 in the thickness direction thereof. The position to be pressed, that is, the recess 32 is formed in a position deviated to an end portion of the packaging material 10 in a longitudinal direction from the center of the packaging material 10 cut in a rectangle. Thus, the other end portion having no recess 32 is folded after forming to provide a cover (cover portion 34).

More specifically, the method of forming the recess 32 may be a method using a die (deep drawing). The molding method may be one that uses a negative die and a positive die arranged with a gap equal to or greater than the thickness of the packaging material 10 therebetween, so that the positive die is pressed into the negative die together with the packaging material 10. By adjusting pressing of the positive die, the depth (deep drawing degree) of the recess 32 can be adjusted as desired. With the recess 32 being formed in the packaging material 10, the embossed packaging material 30 is obtained. The embossed packaging material 30 has a shape, for example, as illustrated in FIGS. 2A and 2B. FIG. 2A shows a perspective view of the embossed packaging material 30, and FIG. 2B is a longitudinal cross-sectional view of the embossed packaging material 30 shown in FIG. 2A taken along the line b-b.

(Step S23)

At step S23, the battery element 1 including a cathode, a separator, an anode, and the like is arranged in the shaped area (recess 32) of the embossed packaging material 30. The leads 2 extending from the battery element 1 and respectively joined to the cathode and the anode are drawn out of the molding area (recess 32). The embossed packaging material 30 is then folded at the approximate center thereof in the longitudinal direction so that the surfaces of the sealant layer 17 are located on the inward side and overlapped with each other, followed by pressure heat-sealing the side of the embossed packaging material 30 sandwiching the leads 2. The pressure heat sealing is controlled by three conditions of temperature, pressure, and time, which are appropriately set. The pressure heat sealing is preferably performed at a temperature of not less than the temperature of fusing the sealant layer 17.

The thickness of the sealant layer 17 before being heat-sealed is preferably in the range of 40% or more and 80% or less relative to the thickness of the leads 2. With the thickness of the sealant layer 17 being not less than the lower limit, the heat-sealing resin is likely to sufficiently fill the end portions of the leads 2. With the thickness of the sealant layer 17 being not more than the upper limit, the thickness of the end portions of the packaging material 10 of the secondary battery 40 can have a moderate thickness, reducing the amount of moisture penetrating from the end portions of the packaging material 10.

(Step S24)

At step S24, the sides of the packaging material are pressure heat-sealed, leaving the side sandwiching the leads 2 unsealed. An electrolyte is then injected from the unsealed side which is then pressure heat-sealed in vacuum. The pressure heat-sealing conditions are similar to those at step S23.

(Step S25)

The end portions of the pressure heat-sealed sides except for the side sandwiching the leads 2 are trimmed and the sealant layer 17 squeezed out of the end portions is removed. The peripheral pressure heat-sealed portions are then turned up toward the shaped area 32 (recess 32) to form turn-up portions 42, thereby obtaining the secondary battery 40.

Second Embodiment

[Power Storage Device Packaging Material]

The description in the first embodiment is applied mutatis mutandis to the description of a packaging material for a power storage device of the present embodiment. FIG. 1 is a schematic cross-sectional view illustrating a packaging material for a power storage device of the present embodiment. In the present embodiment, the substrate protective layer is a cured product of a raw material containing an aromatic polyester urethane resin and a polyisocyanate, and the ratio of the number of moles of hydroxyl groups in the aromatic polyester urethane resin to the number of moles of isocyanate groups in the polyisocyanate is within a specific range. Formability and electrolyte resistance can thereby be improved.

(Substrate Protective Layer 12)

The substrate protective layer 12 is provided on one surface of the substrate layer 11, and obtained by reaction of an aromatic polyester urethane resin with a polyisocyanate. That is, the substrate protective layer 12 is a cured product of a raw material containing an aromatic polyester urethane resin and a polyisocyanate. The polyester urethane resin originally has a urethane group in the structure, and can be thus an improved and even excellent protective layer having high substrate adhesion; however, the inventors' findings revealed that it was preferable to further use a polyisocyanate in combination with a polyester urethane resin, from the perspective of imparting more improved and even excellent electrolyte resistance to the substrate protective layer.

The aromatic polyester urethane resin is a resin obtained by reaction of an aromatic polyester resin with an isocyanate, which is a curing agent. In other words, it can be said that the aromatic polyester urethane resin is an aromatic polyester resin chain-extended with a polyisocyanate.

The aromatic polyester resin is a copolymer comprising, as raw materials, a dicarboxylic acid and a diol, at least one of which is an aromatic type.

Usable dicarboxylic acids are both aliphatic dicarboxylic acids and aromatic dicarboxylic acids; specific examples thereof include aliphatic dicarboxylic acids, such as succinic acid, glutaric acid, adipic acid, pimelic acid, suberic acid, azelaic acid, sebacic acid, and brassylic acid; and aromatic dicarboxylic acids, such as isophthalic acid, terephthalic acid, and naphthalene dicarboxylic acid.

Examples of diols include aliphatic diols, such as ethylene glycol, propylene glycol, butanediol, neopentyl glycol, methyl pentanediol, hexanediol, heptanediol, octanediol, nonanediol, decanediol, and dodecanediol; alicyclic diols, such as cyclohexanediol and hydrogenated xylylene glycol; and aromatic diols, such as xylylene glycol.

Usable examples of the polyisocyanate, which is a curing agent, include various polyisocyanates, such as aromatic polyisocyanates, aliphatic polyisocyanates, and alicyclic polyisocyanates. Specific examples thereof include aliphatic polyisocyanates, such as hexamethylene diisocyanate (HDI); aromatic polyisocyanates, such as tolylene diisocyanate (TDI) and diphenylmethane diisocyanate (MDI); alicyclic polyisocyanates, such as isophorone diisocyanate (IPDI); modified polyisocyanates obtained from one or more of these diisocyanates; and the like.

Regarding the molecular weight of the aromatic polyester urethane resin, the number average molecular weight (Mn) is preferably 10000 to 40000, in terms of electrolyte resistance and adhesion to the substrate layer 11.

The hydroxyl value of the aromatic polyester urethane resin is preferably 2 to 20 KOHmg/g, and more preferably 3 to 6 KOHmg/g. If the hydroxyl value is less than 2 KOHmg/g, a further improvement in durability cannot be expected, whereas if the hydroxyl value is more than 20 KOHmg/g, functionality due to crosslinking is saturated.

The glass transition temperature (Tg) of the aromatic polyester urethane resin is not particularly limited, but is preferably −3 to 100° C., and more preferably 20 to 50° C. However, in the present embodiment, it is preferable to use a blend of two or more aromatic polyester urethane resins having different glass transition temperatures. In general, polyester urethane resins having a high glass transition temperature (40° C. or more) often contain many aromatic units, and have improved and even excellent durability because they have a rigid structure; however, the elongation of the film is likely to be reduced, and formability tends to be inferior. In contrast, polyester urethane resins having a low glass transition temperature (less than 40° C.) contain a fewer number of aromatic units and have a flexible structure; thus, flexibility is improved and even excellent (formability is improved and even excellent), but tack increases, and thus blocking during coating winding tends to be inferior. From the perspective of balancing the hardness and other characteristics of the resin, blending aromatic polyester urethane resins having different glass transition temperatures allows development of improved and even excellent electrolyte resistance, and easily achieves the same level of formability as that of nylon films. In a preferred embodiment, it is preferable to use an aromatic polyester urethane resin obtained by blending at least a resin having a glass transition temperature of 20 to 30° C. and a resin having a glass transition temperature of 40 to 50° C.

As the polyisocyanate to react with an aromatic polyester urethane resin, the polyisocyanates mentioned above used in the synthesis of aromatic polyester urethane resins can be suitably used. Among aromatic polyisocyanates, aliphatic polyisocyanates, and alicyclic polyisocyanates, however, in the present embodiment, polyisocyanates that do not have an alicyclic structure (not alicyclic polyisocyanates) are preferable, and aliphatic polyisocyanates are more preferable, in terms of improving electrolyte resistance. In particular, an adduct or biuret form of hexamethylene diisocyanate is suitably used to impart electrolyte resistance. In addition, when 50 mass % or more of polyisocyanate that does not have an alicyclic structure is used based on the total mass (100 mass %) of the polyisocyanate, there is a tendency that alcohol resistance is also exhibited. For example, when a battery cell manufacturer performs printing with an inkjet printer for lot trace management, wrong information is sometimes printed. In that case, reprinting is performed after the printed part is wiped with alcohol, and such a polyisocyanate type is effective in terms of improving the wiping resistance to alcohol.

The mixing ratio of the aromatic polyester urethane resin, which is a main resin, and the polyisocyanate, which is a curing agent, is adjusted so that the ratio [NCO]/[OH] is 5 to 20, where [OH] is the number of moles of hydroxyl groups in the main resin, and [NCO] is the number of moles of isocyanate groups in the curing agent. If this ratio is less than 5, a further improvement in durability cannot be expected, whereas if this ratio is more than 20, crosslinking points due to urethane bonds become dense; thus, the film may become overly hard. From such a viewpoint, the ratio [NCO]/[OH] is preferably 5 to 20.

The description in the first embodiment is applied mutatis mutandis to the rest of the description of the substrate protective layer 12, except that an aromatic polyester urethane resin is used in place of a polyester resin.

The description in the first embodiment is applied mutatis mutandis to the description of the substrate layer 11, the adhesive layer 13, the metal foil layer 14, the anticorrosion treatment layers 15a and 15b, the sealant adhesive layer 16, and the sealant layer 17, except that an aromatic polyester urethane resin is used in place of a polyester resin.

[Method for Manufacturing Packaging Material, Power Storage Device, and Method for Manufacturing Power Storage Device]

The description in the first embodiment is applied mutatis mutandis to the description of these issues, except that an aromatic polyester urethane resin is used in place of a polyester resin.

Preferred embodiments of the method for manufacturing the power storage device packaging material and the method for manufacturing the power storage device of the present invention have so far been described in detail. However, the present invention should not be construed as being limited to these specific embodiments, but may be variously modified and changed within the range of the spirit of the present invention recited in the claims.

EXAMPLES

In the following, the present invention will be described in more detail by way of Examples. However, the present invention should not be limited to the following Examples.

Experiment 1

Regarding the first aspect of the invention, packaging materials for power storage devices were produced, and their various characteristics were evaluated.

Example 1-1

In Example 1-1, a packaging material 10 for a power storage device was produced in the following manner. First, as the metal foil layer 14, soft aluminum foil 8079 having a thickness of 35 μm (manufactured by Toyo Aluminium K.K.) was used. A sodium polyphosphate-stabilized cerium oxide sol (anticorrosion treatment agent) was applied to both surfaces of the metal foil layer 14 by gravure coating. The sol was prepared using distilled water as a solvent and controlled to have a solid content concentration of 10 mass %. The sol contained 10 parts by mass of phosphoric acid, relative to 100 parts by mass of cerium oxide.

Then, the applied sodium polyphosphate-stabilized cerium oxide sol was dried and successively baked to form the anticorrosion treatment layer 15a on a surface of the metal foil treatment 14 and the anticorrosion treatment layer 15b on the other surface. In this case, the sol was baked at a temperature of 150° C. and for a treatment time of 30 seconds.

Then, a surface of a nylon film (thickness: 15 μm), serving as the substrate layer 11, was corona-treated.

Then, a polyurethane-based adhesive (thickness: 3 μm) was applied, as the adhesive layer 13, to a surface of the anticorrosion treatment layer 15a which faces away from the metal foil layer 14. Then, the metal foil layer 14 was adhered to the corona-treated surface of the substrate layer 11 via the adhesive layer 13 by dry lamination. After that, the structure made up of the substrate layer 11, the adhesive layer 13, the anticorrosion treatment layer 15a, the metal foil layer 14, and the anticorrosion treatment layer 15b was left standing in an atmospheric air at 60° C. temperature for 6 days for aging treatment.

Subsequently, a coating liquid for forming a substrate protective layer was prepared, and applied to a surface of the substrate layer 11 which faces away from the adhesive layer 13, followed by drying, thereby forming a substrate protective layer 12 having a thickness of 3 μm. The coating liquid for forming a substrate protective layer was prepared in the following manner. Specifically, a filler was directly dispersed in a varnished resin coating agent, and other additives, such as a curing agent, were mixed into the filler-blended liquid, thereby producing the coating liquid for forming a substrate protective layer.

Then, the sealant adhesive layer 16 was formed by extruding maleic anhydride modified polypropylene (Trade name: ADMER, manufactured by Mitsui Chemicals, Inc.) serving as a base material of the sealant adhesive layer 16 on a surface of the anticorrosion treatment layer 15b which faces away from the metal foil layer 14. The sealant adhesive layer 16 was ensured to have a thickness of 15 μm. Then, a polyolefin film with a thickness of 20 μm (non-stretched polypropylene film having a sealant adhesive layer 16 side corona-treated surface) serving as the sealant layer 17 was bonded (heat-pressure bonded) to the anticorrosion treatment layer 15b at 180° C. via the sealant adhesive layer 16 by sandwich lamination. A packaging material 10 for a power storage device was produced in this manner.

Other Examples and Comparative Examples

Packaging materials 10 for power storage devices were produced in the same manner as in Example 1-1, except that the substrate protective layer compositions and the structural patterns shown in Table 1 were used. In Table 1, "-A" at the end in the curing agent type column represents an adduct form, and "-N" at the end represents an isocyanurate form. In some Examples, packaging materials were produced while changing the procedure as shown below.

Examples 1-11 and 1-12

In place of forming the anticorrosion treatment layers 15a and 15b using the sodium polyphosphate-stabilized cerium oxide sol, the anticorrosion treatment layers 15a and 15b were formed by performing chromate treatment by applying a treatment liquid comprising a phenol resin, a chromium fluoride compound, and phosphoric acid to both surfaces of the metal foil layer 14 to form a coating, and baking the coating. Packaging materials 10 for power storage devices were produced in the same manner as in Example 1-1 except for this procedure.

Examples 1-13 and 1-14

The anticorrosion treatment layers 15a and 15b were formed by performing chromate treatment in the same manner as in Example 1-11. Moreover, a polyurethane-based adhesive (thickness: 5 μm) was applied to a surface of the anticorrosion treatment layer 15b which faces away from the metal foil layer 14. The polyurethane-based adhesive was prepared by mixing a polyisocyanate with an acid-modified polyolefin dissolved in a mixed solvent of toluene and methylcyclohexane. Then, a polyolefin film with a thickness of 30 μm (non-stretched polypropylene film having a sealant adhesive layer 16 side corona-treated surface) serving as the sealant layer 17 was bonded to the metal foil layer 14 via the sealant adhesive layer 16 by dry lamination. After that, the structure made up of the substrate layer 11, the adhesive layer 13, the anticorrosion treatment layer 15a, the metal foil layer 14, the anticorrosion treatment layer 15b, the sealant adhesive layer 16, and the sealant layer 17 was left standing in an atmospheric air at 40° C. temperature for 6 days for aging treatment. Packaging materials 10 for power storage devices were produced in the same manner as in Example 1-1 except for this procedure.

The sealant adhesive layer 16 adheres the sealant layer 17 to the metal foil layer 14 formed with the anticorrosion treatment layer 15b. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft modifying a polyolefin-based resin with acid. The acid modified polyolefin-based resin, which has a polar group introduced into part of the nonpolar polyolefin-based resin, can firmly adhere to both the sealant layer 17 composed of a nonpolar polyolefin-based resin film or the like, and the anticorrosion treatment layer 15b mostly having polarity. Use of the acid modified polyolefin-based resin improves resistance of the packaging material 10 to the contents, such as the electrolyte, and easily prevents lowering of the adhesive force due to deterioration of the sealant adhesive layer 16 even when hydrofluoric acid is produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin that can be used may also be a copolymer obtained by copolymerizing polar molecules such as of acrylic acid or methacrylic acid with those materials mentioned above, a polymer such as cross-linked polyolefin, or the like. The acid to modify the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the aforementioned adhesive component with an extruder. The sealant adhesive layer 16 of the heat lamination structure preferably has a thickness in the range of 8 to 50 μM.

TABLE 1

| | Substrate protective layer composition | | | | Structural pattern | |
|---|---|---|---|---|---|---|
| | Polyester resin Hydroxyl value (KOHmg/g) | Curing agent Type | [NCO]/[OH] | Filler | Structure | Anticorrosion treatment |
| Comparative Example 1-1 | | None | | | Pattern 2 | Ceria |
| Comparative Example 1-2 | 50 | HDI-A | 1.5 | — | Pattern 2 | Ceria |
| Comparative Example 1-3 | 50 | HDI-A | 3.5 | — | Pattern 2 | Ceria |
| Example 1-1 | 50 | HDI-A | 6 | — | Pattern 2 | Ceria |
| Example 1-2 | 50 | HDI-A | 25 | — | Pattern 2 | Ceria |
| Example 1-3 | 50 | HDI-A | 50 | — | Pattern 2 | Ceria |
| Example 1-4 | 50 | HDI-A | 60 | — | Pattern 2 | Ceria |
| Comparative Example 1-4 | 50 | HDI-A | 80 | — | Pattern 2 | Ceria |
| Example 1-5 | 25 | HDI-A | 50 | — | Pattern 2 | Ceria |
| Comparative Example 1-5 | 6 | HDI-A | 60 | — | Pattern 2 | Ceria |
| Comparative Example 1-6 | 6 | HDI-A | 25 | — | Pattern 2 | Ceria |
| Comparative Example 1-7 | 6 | HDI-A | 6 | — | Pattern 2 | Ceria |
| Comparative Example 1-8 | 6 | HDI-A | 4 | — | Pattern 2 | Ceria |
| Example 1-6 | 50 | IPDI-N | 50 | — | Pattern 2 | Ceria |
| Example 1-7 | 50 | TDI-A | 50 | — | Pattern 2 | Ceria |
| Example 1-8 | 50 | HDI-A | 50 | Silica | Pattern 2 | Ceria |
| Example 1-9 | 50 | HDI-A | 50 | Urethane | Pattern 2 | Ceria |
| Example 1-10 | 50 | HDI-A | 50 | Acrylic | Pattern 2 | Ceria |
| Example 1-11 | 50 | TDI-A | 50 | — | Pattern 2 | Chromate |
| Example 1-12 | 50 | HDI-A | 50 | Silica | Pattern 2 | Chromate |
| Example 1-13 | 50 | TDI-A | 50 | — | Pattern 1 | Chromate |
| Example 1-14 | 50 | HDI-A | 50 | Silica | Pattern 1 | Chromate |

*In the table, Pattern 1 indicates a dry laminate structure, and Pattern 2 indicates a thermal laminate structure.

<Evaluation of Electrolyte Resistance>

An electrolyte (ethylene carbonate/dimethyl carbonate/diethyl carbonate=1:1:1 wt %, $LiPF_6$, 1 M), to which a small amount of water (1500 ppm) had been added, was added dropwise to the coating layer of each of the packaging materials obtained in the Examples and Comparative Examples, and wiped with isopropyl alcohol after a predetermined period of time elapsed. Thereafter, the appearance of the dropping part was evaluated according to the following criteria. Table 2 shows the results.
  A: The electrolyte-dropping part was not recognized after 15 minutes.
  B: The electrolyte-dropping part was not recognized after 10 minutes, but a ring stain appeared after 15 minutes.
  C: The electrolyte-dropping part was not recognized after 5 minutes, but a ring stain appeared after 10 minutes.
  D: The electrolyte-dropping part was not recognized after 3 minutes, but a ring stain appeared after 5 minutes.
  E: The electrolyte-dropping part was not recognized after 1 minute, but a ring stain appeared after 3 minutes.

<Evaluation of Alcohol Resistance>

A 1-cm square of cotton impregnated with ethanol was applied to the coating layer of each of the packaging materials obtained in the Examples and Comparative Examples, and rubbed at a constant speed while applying a load of 500 g onto the cotton (alcohol rubbing method). After rubbing was repeated for a predetermined number of times, the occurrence of peeling of the coating film was evaluated according to the following criteria. Table 2 shows the results.
  A: No peeling occurred even after rubbing was repeated 20 times or more.
  B: No peeling occurred after rubbing was repeated 15 times, but peeling occurred after rubbing was repeated 20 times.
  C: No peeling occurred after rubbing was repeated 10 times, but peeling occurred after rubbing was repeated 15 times.
  D: No peeling occurred after rubbing was repeated 5 times, but peeling occurred after rubbing was repeated 10 times.
  E: No peeling occurred after rubbing was performed once, but peeling occurred after rubbing was repeated 5 times.

<Evaluation of Adhesion>

Using the packaging materials obtained in the Examples and Comparative Examples, the adhesion between the substrate layer 11 and the substrate protective layer 12 was evaluated in the following manner.

First, 11 cuts were made on a test surface using a cutter knife so that the interval of the cuts that reached the substrate was 1 mm, thereby forming 100 squares. Then, a cellophane tape was strongly bonded by pressure to the squares, and the end of the tape was peeled off at one stroke at an angle of 90°. The number of squares from which the coating film was not peeled was visually counted among the 100 squares, and evaluated according to the following criteria. Table 2 shows the results.
  A: 100 squares
  B: 90 to 99 squares
  C: 80 to 89 squares
  D: 70 to 79 squares
  E: Less than 70 squares <Evaluation of Drawing Depth>

For the packaging materials obtained in the Examples and Comparative Examples, drawing depth of deep drawing was evaluated by the following method. First, each packaging material 10 for a power storage device was arranged in a forming apparatus with the sealant layer 17 facing upward. Forming depth of the forming apparatus was set to 5.0 to 7.5 mm per 0.5 mm and the packaging material was cold-formed in an environment of 23° C. room temperature and −35° C. dew point temperature. The punch die used had a rectangular transverse cross-section of 70 mm×80 mm, a bottom with 1.00 mm punch radius (RP), and a side face with 1.00 mm punch corner radius (RCP). The die used had an opening top with 1.00 mm die radius (RD). The presence/absence of breakage and pinholes in the cold-formed area was visually checked by irradiating the packaging material with light to thereby evaluate the maximum value of the drawing depth in which deep drawing was possible without forming breakage or pinholes. Moreover, the drawing depth was evaluated according to the following criteria. Table 2 shows the results.
  A: The difference from when the substrate protective layer was not provided (Comparative Example 1-1) was 0.25 mm or less.
  B: The difference from when the substrate protective layer was not provided was more than 0.25 mm and 0.50 mm or less.
  C: The difference from when the substrate protective layer was not provided was more than 0.50 mm and 1.0 mm or less.
  D: The difference from when the substrate protective layer was not provided was more than 1.0 mm and 1.5 mm or less.
  E: The difference from when the substrate protective layer was not provided was more than 1.5 mm.

<Evaluation of Insulating Properties>

When the substrate protective layer, the substrate layer, the adhesive layer, and the metal foil layer having the anticorrosion treatment layers on both surfaces thereof were laminated in this order, the insulating properties of this laminate were evaluated. A withstand voltage/insulation resistance tester ("TOS9201," produced by Kikusui Electronics Corporation) was used for the evaluation of insulating properties. One electrode was fixed to the exposed anticorrosion treatment layer side, water was added dropwise on the surface of the substrate protective layer, the other electrode was brought into contact with the dropping region, a constant voltage of 100 V was applied for 3 minutes, and the insulation resistance of the laminate was measured. The insulation resistance was evaluated according to the following criteria. Table 2 shows the results.
  A: 20000 MΩ or more.
  B: 10000 MΩ or more and less than 20000 MΩ.
  C: 2000 MΩ or more and less than 10000 MΩ.
  D: Less than 2000 MΩ.

TABLE 2

|  | Electrolyte resistance | Alcohol resistance | Adhesion | Formability (mm) | | Insulating Properties |
| --- | --- | --- | --- | --- | --- | --- |
| Comparative Example 1-1 | E | — | — | 4.00 | A | D |
| Comparative Example 1-2 | E | E | E | 2.50 | D | A |
| Comparative Example 1-3 | D | D | D | 2.50 | D | A |

TABLE 2-continued

|  | Electrolyte resistance | Alcohol resistance | Adhesion | Formability (mm) | | Insulating Properties |
|---|---|---|---|---|---|---|
| Example 1-1 | B | B | B | 3.00 | C | A |
| Example 1-2 | A | A | A | 3.50 | B | A |
| Example 1-3 | A | A | A | 3.50 | B | A |
| Example 1-4 | A | A | A | 3.50 | B | B |
| Comparative Example 1-4 | A | A | A | 1.50 | E | B |
| Example 1-5 | B | B | B | 3.00 | C | A |
| Comparative Example 1-5 | B | B | E | 1.50 | E | A |
| Comparative Example 1-6 | C | C | E | 3.00 | C | A |
| Comparative Example 1-7 | E | E | E | 3.00 | C | A |
| Comparative Example 1-8 | E | E | E | 2.50 | D | A |
| Example 1-6 | C | C | A | 3.50 | B | A |
| Example 1-7 | C | A | A | 3.50 | B | A |
| Example 1-8 | A | A | A | 3.75 | A | A |
| Example 1-9 | A | A | A | 3.75 | A | A |
| Example 1-10 | A | A | A | 3.75 | A | A |
| Example 1-11 | C | A | A | 3.50 | B | A |
| Example 1-12 | A | A | A | 3.75 | B | A |
| Example 1-13 | C | A | A | 3.50 | B | A |
| Example 1-14 | A | A | A | 3.75 | B | A |

The packaging materials of the present Examples can exhibit a good balance of electrolyte resistance, alcohol resistance, adhesion, and formability. In particular, when focusing on the substrate protective layer, it can be understood that the adhesion to the substrate layer can be improved by increasing the number of urethane bonds, and that all of the formability, electrolyte resistance, and alcohol resistance can be satisfied by adjusting the amount of polyisocyanate within a predetermined range.

Experiment 2

Regarding the second aspect of the invention, packaging materials for power storage devices were produced, and their various characteristics were evaluated.

Example 2-1

A packaging material 10 for a power storage device was produced in the same manner as in Example 1-1, except that the substrate protective layer 12 was formed as follows. Specifically, a coating liquid for forming a substrate protective layer was prepared, and applied to a surface of the substrate layer 11 which faces away from the adhesive layer 13, followed by drying, thereby forming the substrate protective layer 12 with a thickness of 5 μm. The coating liquid for forming a substrate protective layer was prepared in the following manner. Specifically, the aromatic polyester urethane resin A and/or B shown in Table 3, and an inorganic filler were added to an organic solvent, and a polyisocyanate resin was further added, thereby forming the coating liquid for forming a substrate protective layer.

TABLE 3

| Polyester urethane resin | Hydroxyl value (KOHmg/g) | Tg (° C.) |
|---|---|---|
| A | 3-4 | 23 |
| B | 3-4 | 46 |

Other Examples and Comparative Examples

Packaging materials 10 for power storage devices were produced in the same manner as in Example 2-1, except that the substrate protective layer compositions and the structural patterns shown in Table 4 were used. In Table 4, "-A" at the end in the isocyanate type column represents an adduct form. In some Examples, packaging materials were produced while changing the procedure as described below.

Example 2-17

A packaging material 10 for a power storage device was produced in the same manner as in Example 2-1, except that the structure was obtained by dry lamination in the same manner as in Example 1-13.

Examples 2-18 and 2-19

Packaging materials 10 for power storage devices were produced in the same manner as in Example 2-1, except that the anticorrosion treatment layers 15a and 15b were formed in the same manner as in Example 1-11.

Examples 2-20 and 2-21

Packaging materials 10 for power storage devices were produced in the same manner as in Example 2-1, except that the anticorrosion treatment layers 15a and 15b were formed in the same manner as in Example 1-11, and the structure was obtained by dry lamination in the same manner as in Example 1-13.

TABLE 4

| | Substrate protective layer composition | | | | Structural pattern | |
|---|---|---|---|---|---|---|
| | Polyester urethane resin Type | Isocyanate Type | [NCO]/[OH] | Filler | Structure | Anticorrosion treatment |
| Comparative Example 2-1 | | None | | — | Pattern 2 | Ceria |
| Comparative Example 2-2 | A | HDI-A | 1 | — | Pattern 2 | Ceria |
| Example 2-1 | A | HDI-A | 5 | — | Pattern 2 | Ceria |
| Example 2-2 | A | HDI-A | 10 | — | Pattern 2 | Ceria |
| Example 2-3 | A | HDI-A | 15 | — | Pattern 2 | Ceria |
| Example 2-4 | A | HDI-A | 20 | — | Pattern 2 | Ceria |
| Comparative Example 2-3 | A | HDI-A | 30 | — | Pattern 2 | Ceria |
| Comparative Example 2-4 | B | HDI-A | 1 | — | Pattern 2 | Ceria |
| Example 2-5 | B | HDI-A | 5 | — | Pattern 2 | Ceria |
| Example 2-6 | B | HDI-A | 10 | — | Pattern 2 | Ceria |
| Example 2-7 | B | HDI-A | 15 | — | Pattern 2 | Ceria |
| Example 2-8 | B | HDI-A | 20 | — | Pattern 2 | Ceria |
| Comparative Example 2-5 | B | HDI-A | 30 | — | Pattern 2 | Ceria |
| Example 2-9 | A | IPDI-A | 10 | — | Pattern 2 | Ceria |
| Example 2-10 | A | TDI-A | 10 | — | Pattern 2 | Ceria |
| Example 2-11 | B | IPDI-A | 10 | — | Pattern 2 | Ceria |
| Example 2-12 | B | TDI-A | 10 | — | Pattern 2 | Ceria |
| Example 2-13 | A/B = 1/1 | HDI-A | 10 | — | Pattern 2 | Ceria |
| Example 2-14 | A/B = 1/1 | HDI-A | 10 | Silica | Pattern 2 | Ceria |
| Example 2-15 | A/B = 1/1 | HDI-A | 10 | Urethane | Pattern 2 | Ceria |
| Example 2-16 | A/B = 1/1 | HDI-A | 10 | Acrylic | Pattern 2 | Ceria |
| Example 2-17 | A/B = 1/1 | HDI-A | 10 | Silica | Pattern 1 | Ceria |
| Example 2-18 | A/B = 1/1 | HDI-A | 10 | — | Pattern 2 | Chromate |
| Example 2-19 | A/B = 1/1 | HDI-A | 10 | Silica | Pattern 2 | Chromate |
| Example 2-20 | A/B = 1/1 | HDI-A | 10 | — | Pattern 1 | Chromate |
| Example 2-21 | A/B = 1/1 | HDI-A | 10 | Silica | Pattern 1 | Chromate |

*In the table, Pattern 1 indicates a dry laminate structure, and Pattern 2 indicates a thermal laminate structure.

<Evaluation of Electrolyte Resistance>

The electrolyte resistance of the packaging materials obtained in the Examples and Comparative Examples was evaluated in the same manner as in Experiment 1 according to the following criteria. Table 5 shows the results.

A: The electrolyte-dropping part was not recognized after 15 minutes.
B: The electrolyte-dropping part was not recognized after 10 minutes, but a ring stain appeared after 15 minutes.
C: The electrolyte-dropping part was not recognized after 5 minutes, but a ring stain appeared after 10 minutes.
D: The electrolyte-dropping part was not recognized after 1 minute, but a ring stain appeared after 5 minutes.

<Evaluation of Alcohol Resistance>

The alcohol resistance of the packaging materials obtained in the Examples and Comparative Examples was evaluated in the same manner as in Experiment 1 according to the following criteria. Table 5 shows the results.

A: No peeling occurred even after rubbing was repeated 20 times or more.
B: No peeling occurred after rubbing was repeated 15 times, but peeling occurred after rubbing was repeated 20 times.
C: No peeling occurred after rubbing was repeated 10 times, but peeling occurred after rubbing was repeated 15 times.
D: No peeling occurred after rubbing was performed once, but peeling occurred after rubbing was repeated 10 times.

<Evaluation of Drawing Depth>

The molding depth of the packaging materials obtained in the Examples and Comparative Examples was evaluated in the same manner as in Experiment 1 according to the following criteria. Table 5 shows the results.

A: The difference from when the substrate protective layer was not provided (Comparative Example 2-1) was 0.25 mm or less.
B: The difference from when the substrate protective layer was not provided was more than 0.25 mm and 0.50 mm or less.
C: The difference from when the substrate protective layer was not provided was more than 0.50 mm and 1.0 mm or less.
D: The difference from when the substrate protective layer was not provided was more than 1.0 mm.

<Evaluation of Insulating Properties>

The insulation resistance of the laminates comprising the substrate protective layer, the substrate layer, the adhesive layer, the metal foil layer having the anticorrosion treatment layers on both surfaces thereof was evaluated in the same manner as in Experiment 1 according to the following criteria. Table 5 shows the results.

A: 20000 MΩ or more.
B: 10000 MΩ or more and less than 20000 MΩ.
C: 2000 MΩ or more and less than 10000 MΩ.
D: Less than 2000 MΩ.

TABLE 5

| | Electrolyte resistance | Alcohol resistance | Formability (mm) | Insulating properties |
|---|---|---|---|---|
| Comparative Example 2-1 | D | — | 4.00 | A | D |
| Comparative Example 2-2 | D | D | 3.50 | B | A |
| Example 2-1 | B | B | 3.50 | B | A |
| Example 2-2 | B | B | 3.50 | B | A |
| Example 2-3 | B | B | 3.50 | B | A |
| Example 2-4 | B | B | 3.50 | B | A |
| Comparative Example 2-3 | B | B | 2.00 | D | B |
| Comparative Example 2-4 | D | D | 3.00 | C | A |
| Example 2-5 | A | A | 3.00 | C | A |
| Example 2-6 | A | A | 3.00 | C | A |
| Example 2-7 | A | A | 3.00 | C | A |
| Example 2-8 | A | A | 3.00 | C | A |
| Comparative Example 2-5 | A | A | 1.75 | D | B |
| Example 2-9 | C | C | 3.50 | B | A |
| Example 2-10 | C | C | 3.50 | B | A |
| Example 2-11 | C | C | 3.00 | C | A |
| Example 2-12 | C | C | 3.00 | C | A |
| Example 2-13 | A | A | 3.50 | B | A |
| Example 2-14 | A | A | 4.00 | A | A |
| Example 2-15 | A | A | 4.00 | A | A |
| Example 2-16 | A | A | 4.00 | A | A |
| Example 2-17 | A | A | 4.00 | A | A |
| Example 2-18 | A | A | 3.50 | B | A |
| Example 2-19 | A | A | 4.00 | A | A |
| Example 2-20 | A | A | 3.50 | B | A |
| Example 2-21 | A | A | 4.00 | A | A |

The packaging materials of the present Examples can exhibit a good balance of electrolyte resistance, alcohol resistance, and formability.

REFERENCE SIGNS LIST

1 . . . Battery element; 2 . . . Lead; 10 . . . Packaging material for power storage device (packaging material); 11 . . . Substrate layer; 12 . . . Substrate protective layer; 13 . . . Adhesive layer; 14 . . . Metal foil layer; 15a, 15b . . . Anticorrosion treatment layer; 16 . . . Sealant adhesive layer; 17 . . . Sealant layer; 30 . . . Embossed packaging material; 32 . . . Shaped area (recess); 34 . . . Cover portion; 40 . . . Secondary battery.

What is claimed is:

1. A packaging material for a power storage device, comprising:
    a structure in which at least a substrate protective layer, a substrate layer, an adhesive layer, a metal foil layer, a sealant adhesive layer, and a sealant layer are laminated in this order,
    wherein the substrate protective layer is a cured product of a raw material containing a polyester resin and a polyisocyanate, wherein a ratio [NCO]/[OH] is 5 to 60, where [OH] is the number of moles of hydroxyl groups in the polyester resin, and [NCO] is the number of moles of isocyanate groups in the polyisocyanate, and
    the polyester resin has a hydroxyl value of 10 to 70 KOHmg/g, wherein the substrate protective layer is an outermost layer of the structure relative to the power storage device and the sealant layer is an innermost layer of the structure relative to the power storage device.

2. The packaging material for a power storage device of claim 1, wherein when a constant voltage of 100 V is applied for 3 minutes between the substrate protective layer and the metal foil layer in a state in which water is attached to the substrate protective layer, the insulation resistance between the layers is 2000 MΩ or more.

3. The packaging material for a power storage device of claim 1, wherein the polyisocyanate contains 50 mass % or more of polyisocyanate that does not have an alicyclic structure.

4. The packaging material for a power storage device of claim 3, wherein the polyisocyanate that does not have an alicyclic structure is an aliphatic polyisocyanate.

5. The packaging material for a power storage device of claim 3, wherein the polyisocyanate that does not have an alicyclic structure is an adduct or biuret form of an aliphatic polyisocyanate.

6. The packaging material for a power storage device of claim 1, wherein the raw material further contains a filler.

7. A method for manufacturing a packaging material for a power storage device, the method comprising the steps of:
    bonding a substrate layer to one surface of a metal foil layer with an adhesive layer interposed therebetween;
    forming a substrate protective layer on a surface of the substrate layer which faces away from the adhesive layer; and
    forming a sealant layer on a surface of the metal foil layer which faces away from the adhesive layer with a sealant adhesive layer interposed therebetween, wherein
    the substrate protective layer is a cured product of a raw material containing a polyester resin and a polyisocyanate,
    a ratio [NCO]/[OH] is 5 to 60, where [OH] is the number of moles of hydroxyl groups in the polyester resin, and [NCO] is the number of moles of isocyanate groups in the polyisocyanate, and
    the polyester resin has a hydroxyl value of 10 to 70 KOHmg/g, wherein the substrate protective layer is an outermost layer of the structure relative to the power storage device and the sealant layer is an innermost layer of the structure relative to the power storage device.

8. A packaging material for a power storage device, comprising:
    structure in which at least a substrate protective layer, a substrate layer, an adhesive layer, a metal foil layer, a sealant adhesive layer, and a sealant layer are laminated in this order,
    wherein the substrate protective layer is a cured product of a raw material containing an aromatic polyester urethane resin and a polyisocyanate, and
    wherein a ratio [NCO]/[OH] is 5 to 20, where [OH] is the number of moles of hydroxyl groups in the aromatic polyester urethane resin, and [NCO] is the number of moles of isocyanate groups in the polyisocyanate, wherein the substrate protective layer is an outermost layer of the structure relative to the power storage device and the sealant layer is an innermost layer of the structure relative to the power storage device.

9. The packaging material for a power storage device of claim 8, wherein the aromatic polyester urethane resin is a blend of two or more aromatic polyester urethane resins having different glass transition temperatures (Tg).

10. A method for manufacturing a packaging material for a power storage device, the method comprising the steps of:
    bonding a substrate layer to one surface of a metal foil layer with an adhesive layer interposed therebetween;

forming a substrate protective layer on a surface of the substrate layer which faces away from the adhesive layer; and forming a sealant layer on a surface of the metal foil layer which faces away from the adhesive layer with a sealant adhesive layer interposed therebetween, wherein the substrate protective layer is a cured product of a raw material containing an aromatic polyester urethane resin and a polyisocyanate, and a ratio [NCO]/[OH] is 5 to 20, where [OH] is the number of moles of hydroxyl groups in the aromatic polyester urethane resin, and [NCO] is the number of moles of isocyanate groups in the polyisocyanate, wherein the substrate protective layer is an outermost layer of the structure relative to the power storage device and the sealant layer is an innermost layer of the structure relative to the power storage device.

* * * * *